(12) United States Patent  (10) Patent No.: US 8,552,315 B2
Yilmaz  (45) Date of Patent:  Oct. 8, 2013

(54) TWO-DIMENSIONAL POSITION SENSOR

(75) Inventor: Esat Yilmaz, Chandler's Ford (GB)

(73) Assignee: Atmel Corporation, San Jose, CA (US)

( * ) Notice: Subject to any disclaimer, the term of this patent is extended or adjusted under 35 U.S.C. 154(b) by 448 days.

(21) Appl. No.: 12/553,589

(22) Filed: Sep. 3, 2009

(65) Prior Publication Data

US 2011/0048812 A1    Mar. 3, 2011

(51) Int. Cl.
*G06F 3/044* (2006.01)

(52) U.S. Cl.
USPC ........................................ 178/18.06; 345/174

(58) Field of Classification Search
None
See application file for complete search history.

(56) References Cited

U.S. PATENT DOCUMENTS

| | | | |
|---|---|---|---|
| 4,879,461 | A | 11/1989 | Philipp |
| 5,730,165 | A | 3/1998 | Philipp |
| 6,452,514 | B1 | 9/2002 | Philipp |
| 7,663,607 | B2 | 2/2010 | Hotelling |
| 7,875,814 | B2 | 1/2011 | Chen |
| 7,920,129 | B2 | 4/2011 | Hotelling |
| 8,031,094 | B2 | 10/2011 | Hotelling |
| 8,031,174 | B2 | 10/2011 | Hamblin |
| 8,040,326 | B2 | 10/2011 | Hotelling |
| 8,049,732 | B2 | 11/2011 | Hotelling |
| 8,179,381 | B2 | 5/2012 | Frey |
| 2008/0246496 | A1 | 10/2008 | Hristov et al. |
| 2009/0315854 | A1 | 12/2009 | Matsuo |
| 2012/0242588 | A1 | 9/2012 | Myers |
| 2012/0242592 | A1 | 9/2012 | Rothkopf |
| 2012/0243151 | A1 | 9/2012 | Lynch |
| 2012/0243719 | A1 | 9/2012 | Franklin |

FOREIGN PATENT DOCUMENTS

| | | |
|---|---|---|
| EP | 1821175 A1 | 8/2007 |
| WO | WO-2009016382 | 2/2009 |
| WO | WO-2009027629 | 3/2009 |
| WO | WO 2012/129247 | 9/2012 |

OTHER PUBLICATIONS

U.S. Appl. No. 61/454,936, filed Mar. 21, 2011, Myers.
U.S. Appl. No. 61/454,950, filed Mar. 21, 2011, Lynch.
U.S. Appl. No. 61/454,894, filed Mar. 21, 2011, Rothkopf.

*Primary Examiner* — Wayne Young
*Assistant Examiner* — Brian Butcher
(74) *Attorney, Agent, or Firm* — Baker Botts LLP

(57) ABSTRACT

A capacitive position sensor is provided having a touch-sensitive area defined by a single-layer of electrodes arranged in a pattern along two axes. The electrode pattern includes a plurality of units each occupying a portion of the touch sensitive area along one axis. Each unit has at least three lines of elongate electrodes spaced apart in the one axis and extending for a length parallel to the other axis. The three lines of elongate electrodes in each unit comprise at least one line of drive electrodes and two lines of sense electrodes or at least one line of sense electrodes and two lines of drive electrodes. Selected electrodes of each unit are arranged in interconnected groups, each group having electrodes from more than one line which have partially overlapping extents along their length.

30 Claims, 13 Drawing Sheets

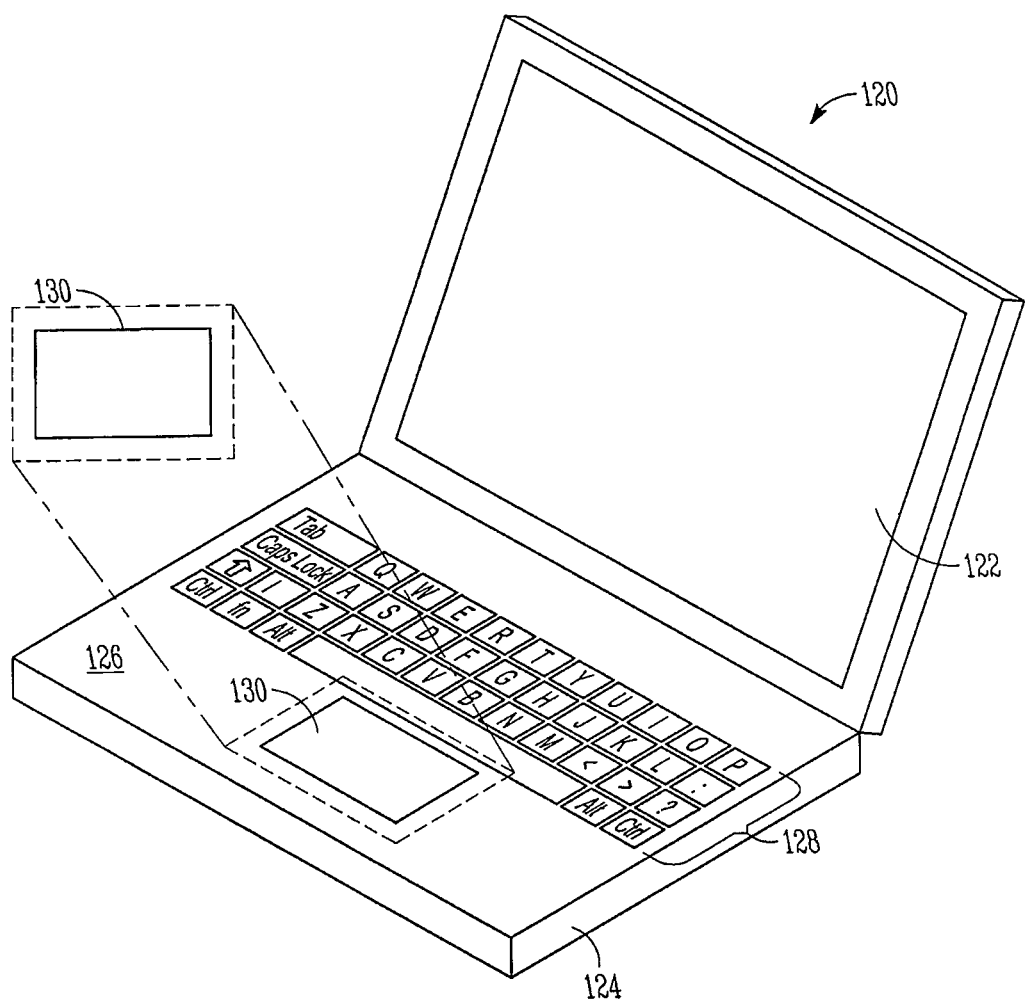
FIG. 8
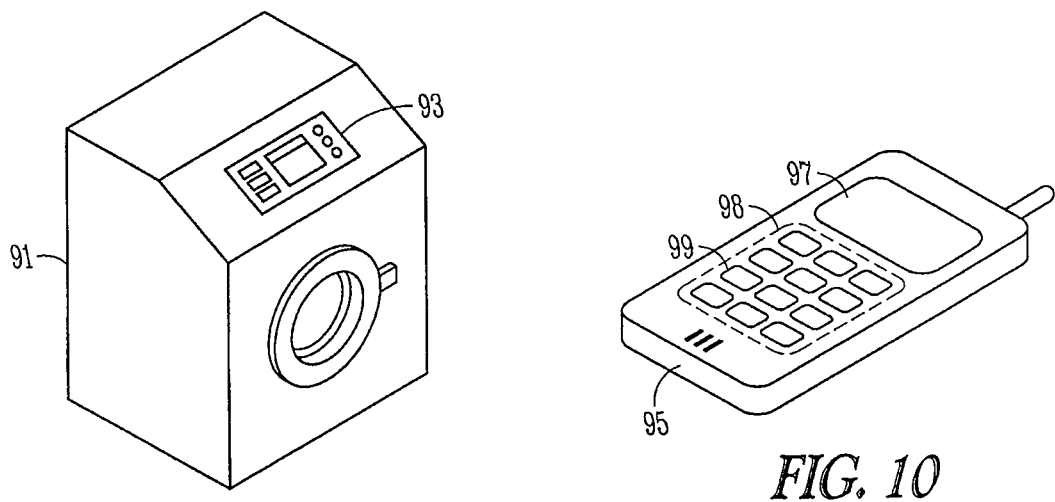
FIG. 9
FIG. 10

TWO-DIMENSIONAL POSITION SENSOR

BACKGROUND

Two-dimensional position sensors may be based on capacitive proximity sensing techniques. Such sensors may be referred to as 2-dimensional capacitive transducing (2DCT) sensors. 2DCT sensors may be based on detecting a disturbance in a capacitive coupling of sensor electrodes caused by the proximity of a pointing object. A measured location for the disturbance corresponds to a measured position for the pointing object.

2DCT sensors are typically actuated by a human finger, or a stylus. Example devices include touch screen and touch sensitive keyboards/keypads, e.g. as used for controlling consumer electronic devices/domestic appliances, and possibly in conjunction with an underlying display, such as a liquid crystal display (LCD), or cathode ray tube (CRT). Other devices which may incorporate 2DCT sensors include pen-input tablets and encoders used in machinery for feedback control purposes, for example. 2DCT sensors are capable of reporting at least a 2-dimensional coordinate, Cartesian or otherwise, related to the location of an object or human body part, by means of a capacitance sensing mechanism.

Devices employing 2DCT sensors have become increasingly popular and common, not only in conjunction with personal computers, but also in all manner of other appliances such as personal digital assistants (PDAs), point of sale (POS) terminals, electronic information and ticketing kiosks, kitchen appliances and the like. 2DCT sensors are frequently preferred to mechanical switches for a number of reasons. For example, 2DCT sensors require no moving parts and so are less prone to wear than their mechanical counterparts. 2DCT sensors can also be made in relatively small sizes so that correspondingly small, and tightly packed keypad arrays can be provided. Furthermore, 2DCT sensors can be provided beneath an environmentally sealed outer surface/cover panel. This makes their use in wet environments, or where there is a danger of dirt or fluids entering a device being controlled attractive. Manufacturers often prefer to employ interfaces based on 2DCT sensors in their products because such interfaces are often considered by consumers to be more aesthetically pleasing than conventional mechanical input mechanisms (e.g. push-buttons).

One prior 2DCT sensor includes a substrate with a sensitive area defined by a pattern of electrodes. The 2DCT may be of the so-called "active" or "mutual" type, in which proximity of an object is sensed by the changes induced in coupling between a drive electrode and one or more adjacent sense electrodes. Measurement of the coupling is carried out by applying a transient voltage to the drive electrode and making a measurement of the capacitance between the drive and associated sense electrode(s) that results.

The pattern of electrodes may include longitudinal (bar) drive electrodes and sense electrodes arranged in an interleaved arrangement between adjacent drive electrodes. The sense electrode pattern comprises four groups of sense electrodes. The groups of sense electrodes co-extend longitudinally having complementary tapers over their distance of co-extension to provide ratiometric capacitive signals. The different regions of co-extending sense electrodes provide ratiometric capacitive signals indicative of capacitive coupling of a user's finger on a part of the sensor where sense electrodes are present. Thus, a user's finger approaching the sensor is sensed by two different electrode groups to provide a beneficial mixing of signals which may be used to determine the x-position of a finger or other object on the sensor. The position of an object on the sensor may be determined by the disruption or reduction of capacitive coupling between a drive electrode and one or more sense electrodes. The signals from the sense electrodes are processed to calculate finger position.

However, it has been found that there are some limitations associated with 2DCT sensors. For example, 2DCT sensors can be sensitive to external ground loading. Furthermore, electrical noise generated from LCD screens can interfere with capacitance measurements when a pointing object approaches the screen. Known methods to minimise the effects of noise on capacitive coupling is to increase the separation or air gap between an LCD screen and an overlaying 2DCT sensor. Alternatively a shielding layer may be incorporated between the LCD screen and a 2DCT sensor to reduce or block the noise induced by the LCD screen.

In one prior device, a capacitive touch sensor has a dielectric panel overlying a drive electrodes with two sense electrodes. A first sense electrode Y0 is positioned to be shielded from the drive electrodes X0, X1, X2, X3 by a second sense electrode Y1, so that the first sense electrode Y0 receives the majority of the charge coupled from the drive electrodes X0, X1, X2, X3 and the second sense electrode Y1 primarily registers noise. A sensing circuit includes two detector channels S0/Y0, S1/Y1 connected to the first (coupled) and second (noise) sense electrodes Y0, Y1 to receive signal samples respectively. The sensing circuit is operable to output a final signal obtained by subtracting the second signal sample from the first signal sample to cancel noise on an output channel.

A further prior capacitive touch sensor has a display device with a touch sensor arranged so that the two dimensional touch sensor is overlaid upon a display panel to form a touch sensitive display screen. The display panel uses an LCD arrangement with vertical and horizontal switching of the LCD pixels driven by a drive circuit. A touch sensing circuit includes a current detection circuit, a noise elimination circuit and a sampling circuit for each of a plurality of sensors, which are arranged to form the two-dimensional sensor array. The current detection circuit receives a strobe signal, which is generated from the horizontal and vertical switching signals of the LCD screen. The strobe signal is used to trigger a blanking of the current detection circuit during a period in which the horizontal switching voltage signal may affect the measurements performed by the detection circuit.

In a further prior capacitive touch sensor device, a two dimensional touch sensor is overlaid on a liquid crystal display (LCD) screen. The effects of switching noise on the detection of an object caused by a common voltage signal of the LCD screen may be reduced by forming the sensor as a plurality of keys. The sensor further includes a capacitance measurement circuit operable to measure the capacitance of the sensing element and a controller circuit to control charging cycles of the capacitance measurement circuit. The controller circuit is configured to produce charging cycles at a predetermined time and in a synchronous manner with a noise signal. For example, the charge-transfer cycles or 'bursts' may be performed during certain stages of the noise output signal from the display screen, e.g. at stages where noise does not significantly affect the capacitance measurements performed. Thus, the sensor can be arranged to effectively pick up the noise output from a display screen and automatically synchronise the charge-transfer bursts to occur during stages of the noise output cycle.

However, noise reduction techniques such as those described above require more complex measurement circuitry. This makes the measurement circuitry more expensive and the time taken to complete an acquisition cycle may be increased.

SUMMARY

A capacitive position sensor has a touch-sensitive area defined by a single-layer of electrodes arranged in a pattern along first and second axes. The pattern includes a plurality of units each occupying a portion of the touch sensitive area along the second axis. Each unit includes at least three lines of elongate electrodes extending substantially parallel to the first axis and spaced apart in the second axis with at least one line of drive electrodes and two lines of sense electrodes per unit. The sense electrodes of each unit are arranged in interconnected groups, each group having sense electrodes from more than one line which have partially overlapping extents along the first axis.

In some embodiments, each unit has two lines of drive electrodes and a plurality of lines of sense electrodes arranged in between the drive electrodes as viewed along the second axis. In some embodiments, each unit has one line of drive electrodes and a plurality of lines of sense electrodes arranged adjacent the drive electrodes as viewed along the second axis. In some embodiments, each unit has lines of sense electrodes arranged on either side of the drive electrodes. There may be two, three or more (e.g. 4 or 5) lines of sense electrodes per unit.

BRIEF DESCRIPTION OF THE DRAWINGS

For a better understanding of the invention and to show how the same may be carried into effect reference is now made by way of example to the accompanying drawings.

FIG. 8 schematically shows a portable personal computer incorporating a sensor according to an embodiment of the invention;

FIG. 9 schematically shows a washing machine incorporating a sensor according to an embodiment of the invention;

FIG. 10 schematically shows a cellular telephone incorporating a sensor according to an embodiment of the invention;

DETAILED DESCRIPTION

Figure 1A:
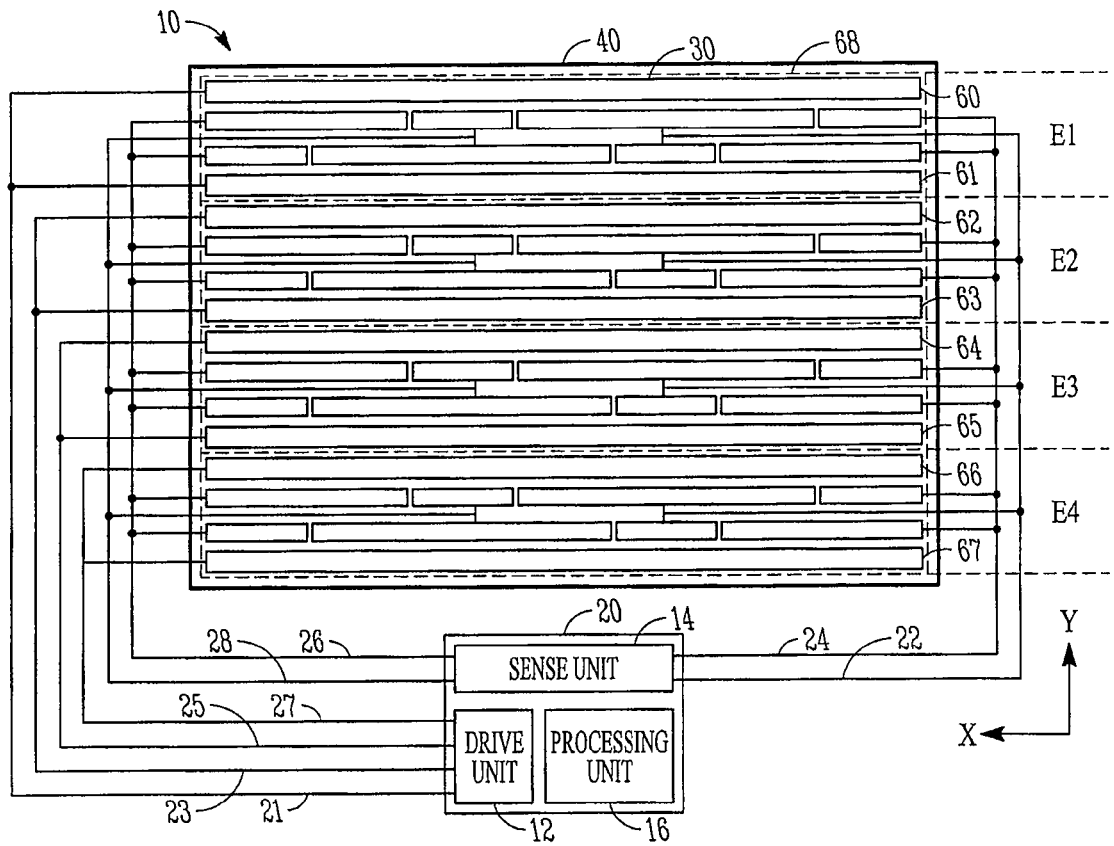
FIG. 1A shows a position sensor according to a first embodiment of the invention comprising a number of electrode units arranged along a first axis, each electrode unit containing an arrangement of drive and sense electrodes.

FIG. 1A is a view of a front side of a position sensor 10 according to a first embodiment. The front side of the position sensor is typically the side facing the user during normal use of the sensor or an apparatus incorporating the sensor. The sensor 10 has a substrate 40 bearing an electrode pattern 30, defining a sensitive area of the sensor, and a controller 20. The controller 20 is coupled to electrodes within the electrode pattern by a series of electrical connections which will be described below. The electrode pattern is on one side of the substrate, typically on the opposite side of the substrate that faces the user or underside of the substrate.

The electrode pattern 30 on the substrate 40 can be provided using conventional techniques (e.g. lithography, deposition, or etch or deactivation techniques). The substrate may be formed of a dielectric material such as a plastic film, in this case Polyethylene Terephthalate (PET). The electrodes forming the electrode pattern 30 may be formed of a transparent conductive material such as Indium Tin Oxide (ITO). Alternatively, the electrodes may be formed from an opaque conductive material such as metal, e.g. copper. The substrate may be bonded to an overlying panel (not shown) using a suitable pressure sensitive adhesive (PSA) which may be clear to allow light transmission. Thus the sensitive area of the sensor as a whole is transparent. If transparent, the sensor layer may be used over an underlying display without obscuring the display. In other embodiments, if the sensor layer is opaque, it may comprise a conventional printed circuit board or other substrate with a copper electrode pattern, e.g. for use in a mobile telephone keypad. Glass is another common substrate material. The electrodes may also be embedded in the substrate.

The controller 20 provides the functionality of a drive unit 12 for supplying drive signals to portions of the electrode pattern 30, a sense unit 14 for sensing signals from other portions of the electrode pattern 30, and a processing unit 16 for calculating a position based on the different sense signals seen for drive signals applied to different portions of the electrode pattern. The controller 20 thus controls the operation of the drive and sense units, and the processing of responses from the sense unit 14 in the processing unit 16, in order to determine the position of an actuating object, e.g. a finger or stylus, adjacent the sensor 10. The drive unit 12, sense unit 14 and processing unit 16 are shown schematically in FIG. 1A as separate elements within the controller. However, in general, the functionality of all these elements may be provided by a single integrated circuit chip, for example a suitably programmed general purpose microprocessor, or field programmable gate array, or an application specific integrated circuit, such as in a microcontroller format.

In some embodiments, a single drive unit with appropriate multiplexing may be used so that all of the drive electrodes are driven by one drive circuit, although a separate drive unit for each drive channel may also be used.

Referring to FIG. 1A, there are provided a number of electrode units. In particular, four units are shown E1, E2, E3, E4 which are highlighted by broken lines 68. Each of the units of electrodes extend in an x-direction also referred to as a first direction or latitudinal direction. The electrode units are spaced apart in the y-direction or along a second axis.

Each of the units of electrodes shown in FIG. 1A include two drive electrodes, as will be described below, such that there are a total of eight drive electrodes 60, 61, 62, 63, 64, 65, 66, 67. Associated with the two drive electrodes in each electrode unit are two lines of sense electrodes, the first line being directly adjacent one of the drive electrodes and the second line being directly adjacent the first line and the second drive electrode. There are thus four lines of electrodes—two drive and two sense—extending parallel to each other. These four lines of electrodes collectively form a functional unit which is referred to as the electrode unit. The electrodes are generally longitudinal in shape, such as in the shape of a bar or elongated rectangle form that is compatible with current fabrication techniques.

The electrode units are connected to the drive unit 12 and the sense unit 14 via a number of electrical connections. Referring to the drive electrodes, the electrodes 60 and 61, 62 and 63, 64 and 65, 66 and 67 are connected to the drive unit via a number of drive connections 21, 23, 25, 27. Four sense connections 22, 24, 26, 28 are used to connect the sense electrodes of each electrode unit E1, E2, E3, E4 to the sense unit 14, as will be described below. The sense electrodes are connected together to form first, second, third and fourth groups of sense electrodes. The first, second, third and fourth groups of sense electrodes are connected to the sense unit 14 via the four sense connections 22, 24, 26, 28.

Figure 1B:
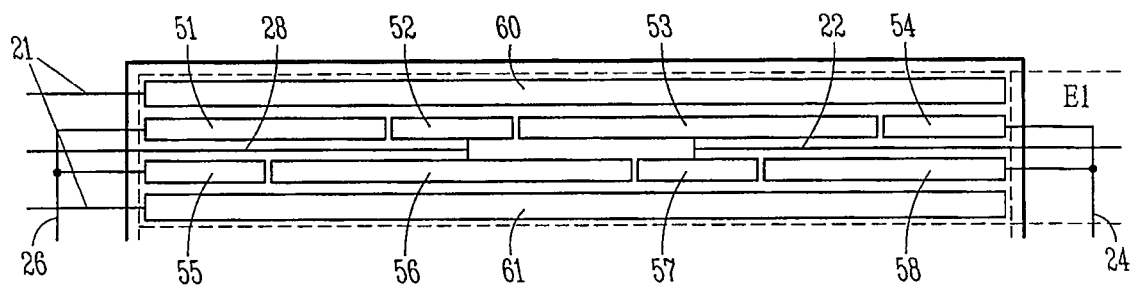
FIG. 1B shows an expanded view of one of the electrode units shown in FIG. 1A.

FIG. 1B shows an expanded view of a portion of the sensor 10 which contains one of the electrode units E1. Within the electrode unit E1 shown in the figure there are two drive electrodes 60, 61 extending parallel to the first axis across the sensing area. The term "parallel" is meant to cover tolerances of designs and equipment for forming lines, to ensure that "parallel" is not interpreted as an absolute. The drive electrodes 60, 61 are electrically coupled together and connected to the drive unit (not shown) via a drive connection 21. There are two lines of sense electrodes associated with the two drive electrodes 60, 61. The first line of sense electrodes adjacent the first drive electrode 60, comprises four segments of sense electrodes 51, 52, 53, 54 isolated from one another. The second line of sense electrodes adjacent the first line and the second drive electrode 61, comprises four segments of sense electrodes 55, 56, 57, 58 isolated from one another. The various connections described may be formed of the same material as the electrodes, or may be formed of a metal or other highly conductive material to lower the resistance of such connections.

The extent of the isolated sense electrodes may vary, such that the first sense electrodes 51, 55 have different extents for example. The sense electrodes are interconnected to form partially overlapping sense electrodes. As shown in FIG. 1B, the first two sense electrodes 51, 55 of the two sense lines are electrically coupled together and connected to the sense unit (not shown) via sense connection 26. The second two sense electrodes 52, 56 of the two sense lines are electrically coupled together and connected to the sense unit (not shown) via sense connection 28. The third two sense electrodes 53, 57 of the two sense lines are electrically coupled together and connected to the sense unit (not shown) via sense connection 22. The fourth two sense electrodes 54, 58 of the two sense lines are electrically coupled together and connected to the sense unit (not shown) via sense connection 24.

The above arrangement of connections between sense electrodes may be repeated for all electrode units and all the first, second, third and fourth sense electrodes that are connected together for all electrode units as described above. Thus, the neighboring sense electrodes from the two sense lines form co-extensive sense electrodes or partially overlapping extents in the first direction or along the first axis. For example, the first sense electrodes 51, 55 of the two sense lines partially overlap the second sense electrodes 52, 56 of the two sense lines.

Referring to the sense connections, the sense electrodes 51, 55, 54, 58 having an edge at the periphery of the electrode pattern are connected to the sense unit via connections 24, 26 that extend from the periphery edge of the electrodes. However, the sense electrodes 52, 56, 53, 57 in the centre of the electrode pattern are connected via tracks or connections 28, 22 that are routed in between the first and second lines of sense electrodes as shown in FIG. 1B. It will be appreciated that other techniques for routing the connection or tracks might be used, such as a spine for connecting the central sense electrodes. However, typically the connections or tracks are not routed between the sense electrodes and the adjacent drive electrodes along their principal coupling edge, since this might reduce the capacitive coupling between the electrodes. The tracks are typically made of the same material as the electrodes and formed at the same time, e.g. made of ITO or a metal such as copper, silver or gold. However, the tracks could be made of a different material, e.g. the electrodes could be made from ITO and the tracks from copper or other metal such as gold or silver.

Adjacent first and second sense electrodes in the x-direction or first direction form co-extensive complementary electrodes over their distance of co-extension to provide ratiometric capacitive signals. Similarly, respective second and third, and third and fourth electrodes that are electrically coupled form co-extensive complementary electrodes over their distance of co-extension to provide ratiometric capacitive signals. That is to say that the sense electrodes from more than one line have partially overlapping extents along the first axis.

The two lines of sense electrodes in each electrode unit shown in FIGS. 1A and 1B occupy a similar sense area to some prior devices. Thus, the effective sense area is kept the same for some embodiments, but the electrode area is reduced. The reduced sense electrode area may result in a reduction in noise pick-up.

The sensor 10 includes a plurality of driven electrodes and a plurality of sense electrodes comprising a network of interconnected electrodes across the sensitive area of the sensor. Each neighboring two drive electrodes and pairs of first, second, third or fourth sense electrodes in an electrode unit may be considered to correspond to a discrete sensor area. In use, the position of an object is determined in a measurement acquisition cycle in which the bar or driven electrodes are sequentially driven by respective drive channels and the amount of charge transferred to the sense electrodes from each driven electrode is determined by the sense channels. In the following the term "event" will be used to describe the act of applying a drive pulse or set of pulses to a drive electrode and then sensing the charge transferred to the paired sense electrodes.

The x-position of the touch or other actuation is obtained by ratiometric interpolation of the signal strength of adjacent sense electrodes in the x-direction or first direction with the highest signal. Referring the electrode unit E1 shown in FIG. 1B four electrodes would be used to interpolate a touch in the x-direction. Once the full set of sense signals is collected from driving each of the drive electrodes in FIG. 1A, the two adjacent events that yielded the strongest signals are selected. The x-position is determined by ratiometric interpolation of the signal strength of these two signals. For example, two electrodes 51, 55 in the first group of sense electrodes adjacent two electrodes 52, 56 in the second group of sense electrodes within electrode unit E1, connected to the sense unit via sense connections 26, 28 might yield the strongest signals. Therefore, the x-position is determined by ratiometric interpolation of the signal strength of the signals from these two sense connections 26, 28. Alternatively, three signals may be used. For example, the signal from the sense electrode that yielded the strongest signal and the signals from the two adjacent sense electrodes.

The y-position of the touch or other actuation is also obtained by ratiometric interpolation of the signal strength. Once the full set of sense signals are collected from the sense connections 22, 24, 26, 28 after driving the drive electrodes via drive connections 21, 23, 25, 27, the two adjacent drive events that yielded the strongest signals are selected, and the position is determined by ratiometric interpolation of the signal strength of these two signals. For example, if the strongest pair of adjacent signals is obtained from the driving of electrodes 60 and 61 and, 62 and 63, and the signal obtained when driving electrode 62 and 63 is two times greater than the signal obtained when driving electrode 60 and 61, then the touch is determined to have taken place ⅓ of the way from the drive electrodes 62 and 63 towards the drive electrodes 60 and 61.

Alternative interpolation methods may incorporate weighting factors, for example with the signals from some sense electrodes having a lower weighting than the signals from other sense electrodes. Another example might be to weight according to expected hand shadow effects. Interpolation need not be done in a row-wise and column-wise manner as described above. It is understood that other interpolation methods for determining the position of a touch event are possible without departing from the scope of the present subject matter.

Figure 1C:
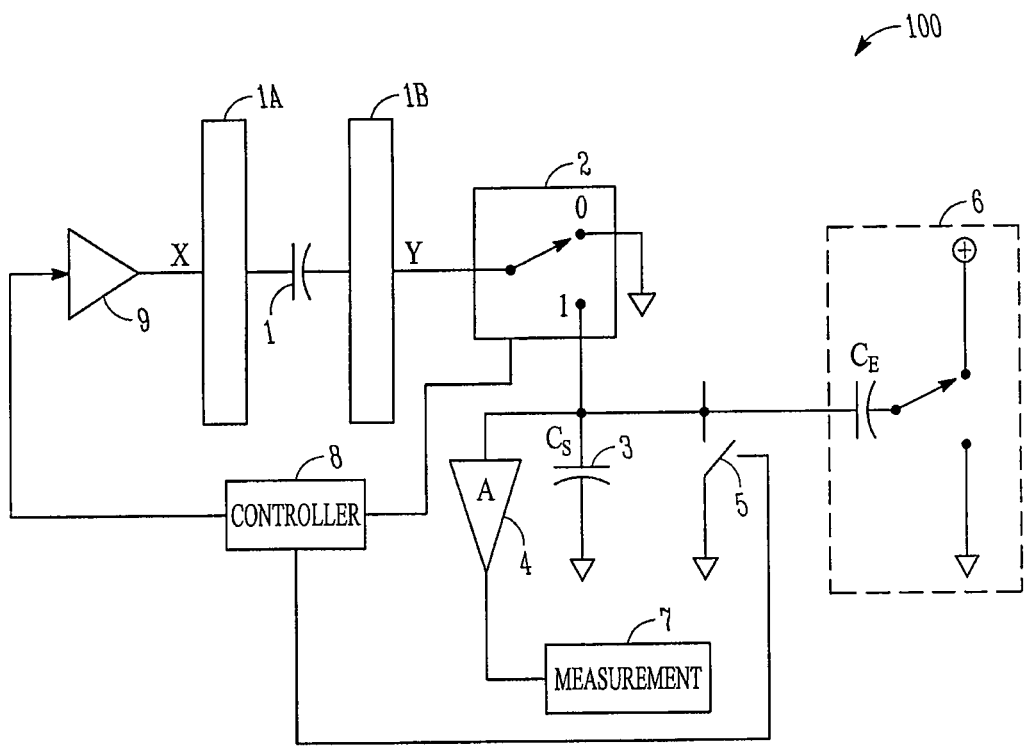
FIG. 1C schematically shows a circuit which may be used to measure the charge transferred from a driven one of the drive electrodes to the sense electrodes.

FIG. 1C schematically shows a circuit 100 which may be used to measure the charge transferred from a driven one of the drive electrodes to the sense electrodes, the drive electrode being driven at a given time and the sense electrode having a self capacitance. The charge transferred is a function of the electrode geometries, particularly in the regions where they are at their closest. Thus, the driven drive electrode is schematically shown as a first plate 1A of a capacitor 1 and the sense electrode is schematically shown as a second plate 1B of the capacitor 1. In one embodiment, the circuit may be based in part on charge-transfer circuits and methods.

As noted above, the example shown in FIG. 1A comprises a single circuit that is switched between each of the drive and sense electrodes using appropriate de-multiplexing and multiplexing techniques respectively.

The drive channel 9 associated with the presently driven electrode 1A, the sense channel Y associated with sense electrode 1B and elements of the sensor controller are shown as combined processing circuitry 100 in FIG. 1C. The processing circuitry 100 comprises a sampling switch 2, a charge integrator 3 (shown here as a simple capacitor, $C_s$), an amplifier 4 and a reset switch 5, and may also comprise optional charge cancellation circuit 6 for shunting current to ground. However, it will be appreciated that the amplifier 4 may not be used in some embodiments. The drive channel 9 and the sampling switch 2 are provided with a suitable synchronizing means 8, which may be a microprocessor, microcontroller or other digital controller, to control charging, resetting and measuring the charge integrator 3. Voltage on the charge integrator 3 is measured using a measurement means 7.

Figure 1D:
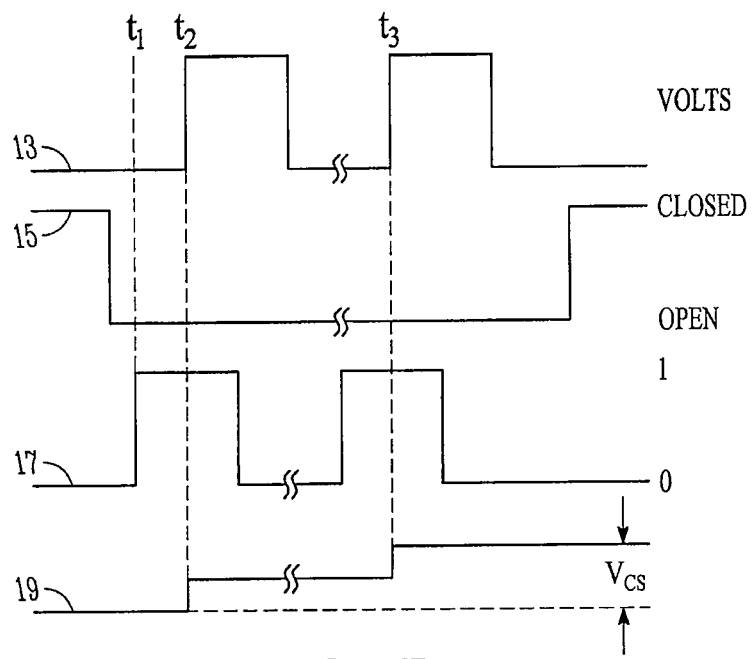
FIG. 1D shows schematically the timing relationships of operation of the circuit of FIG. 1C.

FIG. 1D shows schematically the timing relationships between the driven electrode drive signal from the drive channel 9 and the sample timing of switch 5. FIG. 1D includes the driven electrode drive signal 13, the state 15 of the reset switch 5, the state 17 of the sampling switch 2, and the voltage 19 across the charge integrator 3. Referring to FIGS. 1C and 1D of the implementation shown, the reset switch 5 is initially closed in order to reset the charge integrator 3 to a known initial state (e.g., zero volts). The reset switch 5 is then opened, and at some time thereafter $t_1$ the sampling switch 2 is connected to charge integrator 3 via terminal 1 of the switch 2 for an interval during which the drive channel 9 emits a positive transition $t_2$, and thereafter reconnects to terminal 0, which is an electrical ground or other suitable reference potential. The drive channel 9 then returns to ground, and the process repeats again for a total of 'n' cycles, $t_3$, (where n may be 1 (i.e. 0 repeats), 2 (1 repeat), 3 (2 repeats) and so on). It can be helpful if the drive signal does not return to ground before the charge integrator is disconnected from the sense electrode since otherwise an equal and opposite charge would flow into/out of the sense channel during positive and negative going edges, thus leading to no net transfer of charge into the charge detector. Following the desired number of cycles, the sampling switch 2 is held at position 0 while the voltage on the charge integrator 3, $V_{Cs}$ is measured by a measurement means 7, which may comprise an amplifier, ADC or other circuitry as may be appropriate to the application at hand. After the measurement is taken, the reset switch 5 is closed again, and the cycle is restarted, though with the next drive channel and driven electrode in sequence replacing the drive channel 9 and driven electrode 1A. The process of making a measurement for a given driven electrode is referred to here as being a measurement 'burst' of length 'n' where 'n' can range from 1 to any finite number. The circuit's sensitivity is directly related to 'n' and inversely to the value of the charge integrator 3.

It will be understood that the circuit element designated as a charge integrator 3 provides a charge integration function that may also be accomplished by other means, and that this type of circuit is not limited to the use of a ground-referenced capacitor as shown by reference character 3. It should also be self-evident that the charge integrator 3 can be an operational amplifier based integrator to integrate the charge flowing through in the sense circuitry. Such integrators also use capacitors to store the charge. It may be noted that although integrators add circuit complexity, they provide a more ideal summing-junction load for the sense currents and more dynamic range. If a slow speed integrator is employed, it may be necessary to use a separate capacitor in the position of 3 to temporarily store the charge at high speed until the integrator can absorb it in due time, but the value of such a capacitor becomes relatively non-critical compared to the value of the integration capacitor incorporated into the operational amplifier based integrator.

It can be helpful for the sampling switch 2 to connect the sense electrode of the sensor to ground when not connected to the charge integrator 3 during the changes of drive signal of the chosen polarity (in this case positive going). Such a connection of the sense electrode of the sensor to ground may create an artificial ground plane, thus reducing RF emissions, and also, as noted above, permitting the coupled charge of opposite polarity to that being sensed by the charge integrator 3 to properly dissipate and neutralize. Furthermore, such connection may be used to prevent noise charging/discharging the charge integrator 3. As an alternative to a single-pole double-throw (SPDT) switch 2, two independent switches can be used if timed in an appropriate manner.

There are many signal processing options possible for the manipulation and determination of a detection or measurement of signal amplitude. Signal cancellation circuit 6 may be used to reduce the voltage (i.e. charge) build-up on the charge integrator 3 concurrently with the generation of each burst (positive going transition of the drive channel), so as to permit a higher coupling between the driven electrodes and the receiving sense electrodes. One benefit of this approach is to allow a large sensing area that is sensitive to small deviations in coupling between the electrodes at relatively low cost. Such large sense couplings are present in physically relatively large electrodes such as might be used in human touch sensing pads. Charge cancellation permits measurement of the amount of coupling with greater linearity, because linearity is dependent on the ability of the coupled charge from the driven electrode 1A to the sense electrode 1B to be sunk into a 'virtual ground' node over the course of a burst. If the voltage on the charge integrator 3 were allowed to rise appreciably during the course of a burst, the voltage would rise in inverse exponential fashion. This exponential component has a deleterious effect on linearity and hence on available dynamic range.

The drive channel 9 may be a simple CMOS logic gate powered from a conventionally regulated supply and controlled by the sensor controller 8 to provide a periodic plurality of voltage pulses of a selected duration (or in a simple implementation a single transition from low-to-high or high-to-low voltage, e.g. a burst of one pulse). Alternatively, the drive channel 9 may comprise a sinusoidal generator or generator of a cyclical voltage having another suitable waveform. A changing electric field is thus generated on the rising and failing edges of the train of voltage cycles applied to the driven electrode. The driven electrode 1A and the sense electrode 1B are assumed to act as opposing plates of a capacitor having a capacitance $C_E$. Because the sense electrode is capacitively coupled to the driven electrode, it receives or sinks the changing electric field generated by the driven column electrode. This results in a current flow in the sense electrode induced by the changing voltage on the driven electrode through capacitive differentiation of the changing electric fields. The current will flow towards (or from, depending on polarity) sense channels in a sense unit. As noted above, the sense channel may comprise a charge measurement circuit configured to measure the flow of charge into/out of (depending on polarity) the sense channel caused by the currents induced in the sense electrode.

The capacitive differentiation occurs through the equation governing current flow through a capacitor, namely:

$$I_E = C_E \times \frac{dV}{dt}$$

where $I_E$ is the instantaneous current flowing to a sense channel and $dV/dt$ is the rate of change of voltage applied to a driven electrode. The amount of charge coupled to the sense electrode (and so into/out of the sense channel) during an edge transition is the integral of the above equation over time, i.e.

$$Q_E = C_E \times V.$$

The charge coupled on each transition, $Q_E$, is independent of the rise time of V (i.e. dV/dt) and is a function of the voltage swing at the driven electrode (which may readily be fixed) and the magnitude of the coupling capacitance $C_E$ between the driven electrode and sense electrode. Thus a determination of the charge coupled into/out of charge detector comprising the sense channel in response to changes in the drive signal applied to the driven electrode is a measure of the coupling capacitance $C_E$ between the driven electrode and the sense electrode.

The capacitance of a conventional parallel plate capacitor is almost independent of the electrical properties of the region outside of the space between the plates (at least for plates that are large in extent compared to their separation). However, for a capacitor comprising neighboring electrodes in a plane this is not the case. This is because at least some of the electric fields connecting between the driven electrode and the sense electrode "spill" out from the substrate. This means the capacitive coupling (i.e. the magnitude of $C_E$) between the driven electrode and the sense electrode is to some extent sensitive to the electrical properties of the region in the vicinity of the electrodes in to which the "spilled" electric field extends.

In the absence of any adjacent objects, the magnitude of $C_E$ is determined primarily by the geometry of the electrodes, and the thickness and dielectric constant of the sensor substrate. However, if an object is present in the region into which the electric field spills outside of the substrate, the electric field in this region may be modified by the electrical properties of the object. This causes the capacitive coupling between the electrodes to change, and thus the measured charge coupled into/from the charge detector comprising the sense channel(s) changes. For example, if a user places a finger in the region of space occupied by some of the spilled electric fields, the capacitive coupling of charge between the electrodes will be reduced because the user will have a substantial capacitance to ground (or other nearby structures whose path will complete to the ground reference potential of the circuitry controlling the sense elements). This reduced coupling occurs because the spilled electric field which is normally coupled between the driven electrode and sense electrode is in part diverted away from the electrode to earth. This is because the object adjacent the sensor acts to shunt electric fields away from the direct coupling between the electrodes.

Thus, by monitoring the amount of charge coupled between the driven electrode and the sense electrode, changes in the amount of charge coupled between them can be identified and used to determine if an object is adjacent the sensor (i.e. whether the electrical properties of the region into which the spilled electric fields extend have changed).

FIGS. 2A, 2B, 2C, 2D, 3, 4A, 4B, 5A, 5B, 6A and 6B show further electrode patterns which may be applied to a substrate incorporated in a capacitive position sensor. These electrode patterns are similar to the electrode patterns of FIG. 1A. Identical reference numerals are used to denote the same features where appropriate.

Figure 2A:
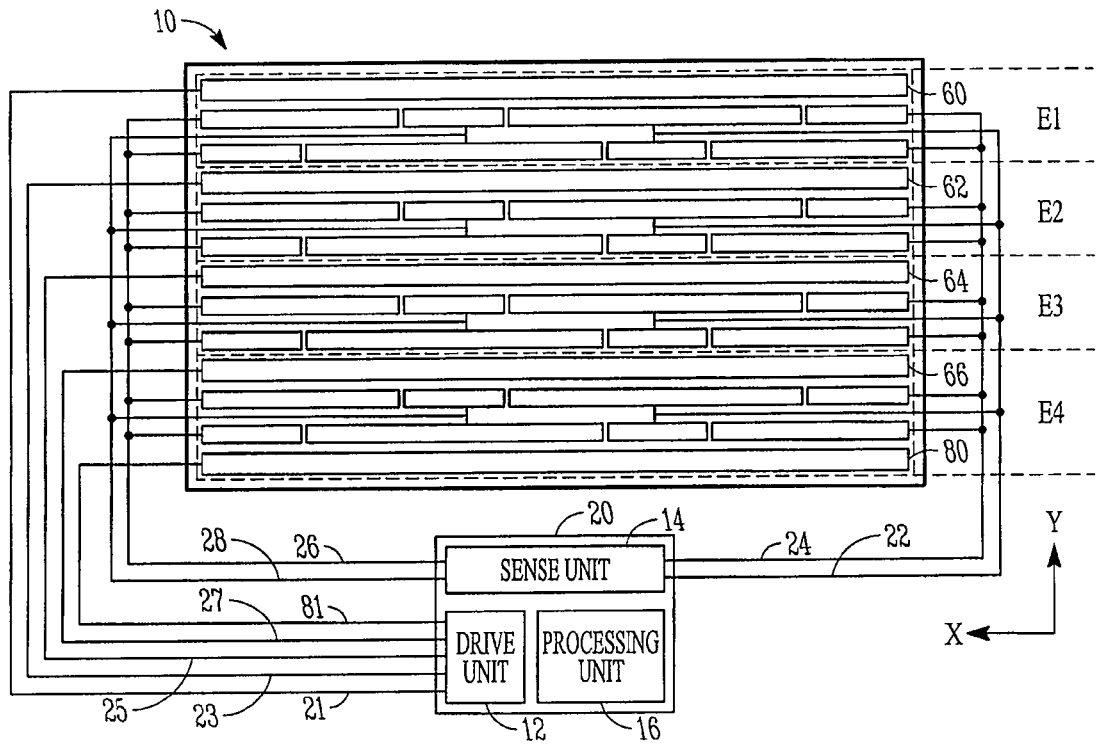
FIG. 2A shows a position sensor according to a second embodiment of the invention comprising a number of electrode units arranged along a first axis, each electrode unit containing an arrangement of drive and sense electrodes.

FIG. 2A is a view of a front side of a position sensor 10 according to a second embodiment of the invention. The position sensor shown in FIG. 2A is similar to the sensor shown in FIG. 1A in layout and operation except the number of drive electrodes is reduced. In FIG. 2A, each electrode unit E1, E2, E3, E4 contains a respective single drive electrode 60, 62, 64, 66. For each drive electrode there are two lines of sense electrodes, the first line being directly adjacent the associated drive electrode and the second line being directly adjacent the first line. There are thus three lines of electrodes—one drive and two sense—extending parallel to each other. These three lines of electrodes collectively form an electrode unit. The final unit E4 may be terminated with a drive electrode 80 adjacent the lines of sense electrodes at the extent of the electrode pattern in the y-direction and coupled to drive unit 12 via a drive connector 81.

Figure 2B:
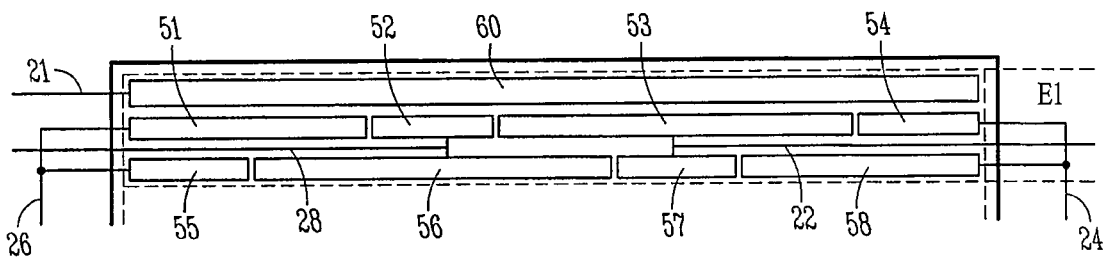
FIG. 2B shows an expanded view of one of the electrode units shown in FIG. 2A.

FIG. 2B shows an expanded view of a portion of the sensor 10 which contains one of the electrode units E1. It will be appreciated that only a single electrode unit E1 is shown in FIG. 2B, but the same arrangement may be used for all the other electrode units shown in FIG. 2A. The electrode unit E1 shown in FIG. 2B has only one drive electrode 60 extending parallel to the first axis.

Figure 2C:
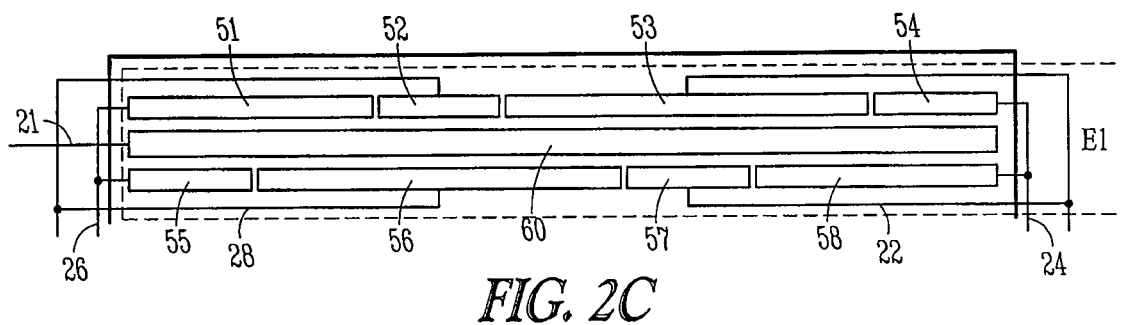
FIG. 2C shows an exploded view of one of the electrode units shown in FIG. 2A with an alternative arrangement of drive and sense electrodes.

FIG. 2C shows an electrode unit E1 with an alternative sense electrode arrangement to that shown in FIG. 2B. It will be appreciated that only a single electrode unit E1 is shown in FIG. 2C, but the same arrangement may be used for all the other electrode units shown in FIG. 2A. In the electrode unit E1 shown in FIG. 2C the two lines of sense electrodes are arranged adjacent the drive electrodes at different edges. The first sense line of sense electrodes 51, 52, 53, 54 is arranged adjacent one of the longitudinal edges of the drive electrode 60 and the second sense line of sense electrodes 55, 56, 57, 58 is arranged adjacent the opposing longitudinal edge of the drive electrode 60. Similar connections are made to the sense electrodes via sense connections 28, 22, where the sense connections do not extend between the drive and sense electrodes within an electrode unit, rather the sense electrodes are directly adjacent the drive electrodes.

Figure 2D:
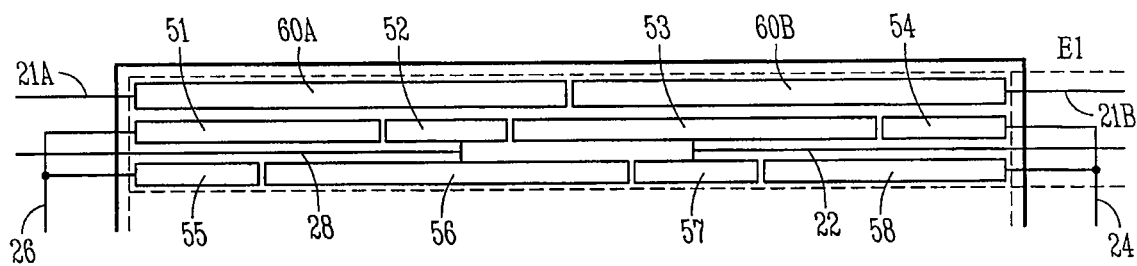
FIG. 2D shows an exploded view of one of the electrode units shown in FIG. 2A with an alternative arrangement of drive and sense electrodes.

FIG. 2D shows an electrode unit E1 with an alternative sense electrode arrangement to that shown in FIG. 2B. It will be appreciated that only a single electrode unit E1 is shown in FIG. 2D, but the same arrangement may be used for all the other electrode units shown in FIG. 2A. In the electrode unit E1 shown in FIG. 2D the drive line is provided by two drive electrodes 60A, 60B. The drive electrodes 60A, 60B are connected to the drive unit (not shown) via drive connections 21A, 21B. The two drive electrodes 60A, 60B may be driven together in one embodiment. This arrangement of drive electrodes may be used to allow the connections to the central sense electrodes 52, 53, 56, 57 to be routed between the two drive electrodes, or to route a spine of a sense electrode, but such routing is not shown.

Figure 3:
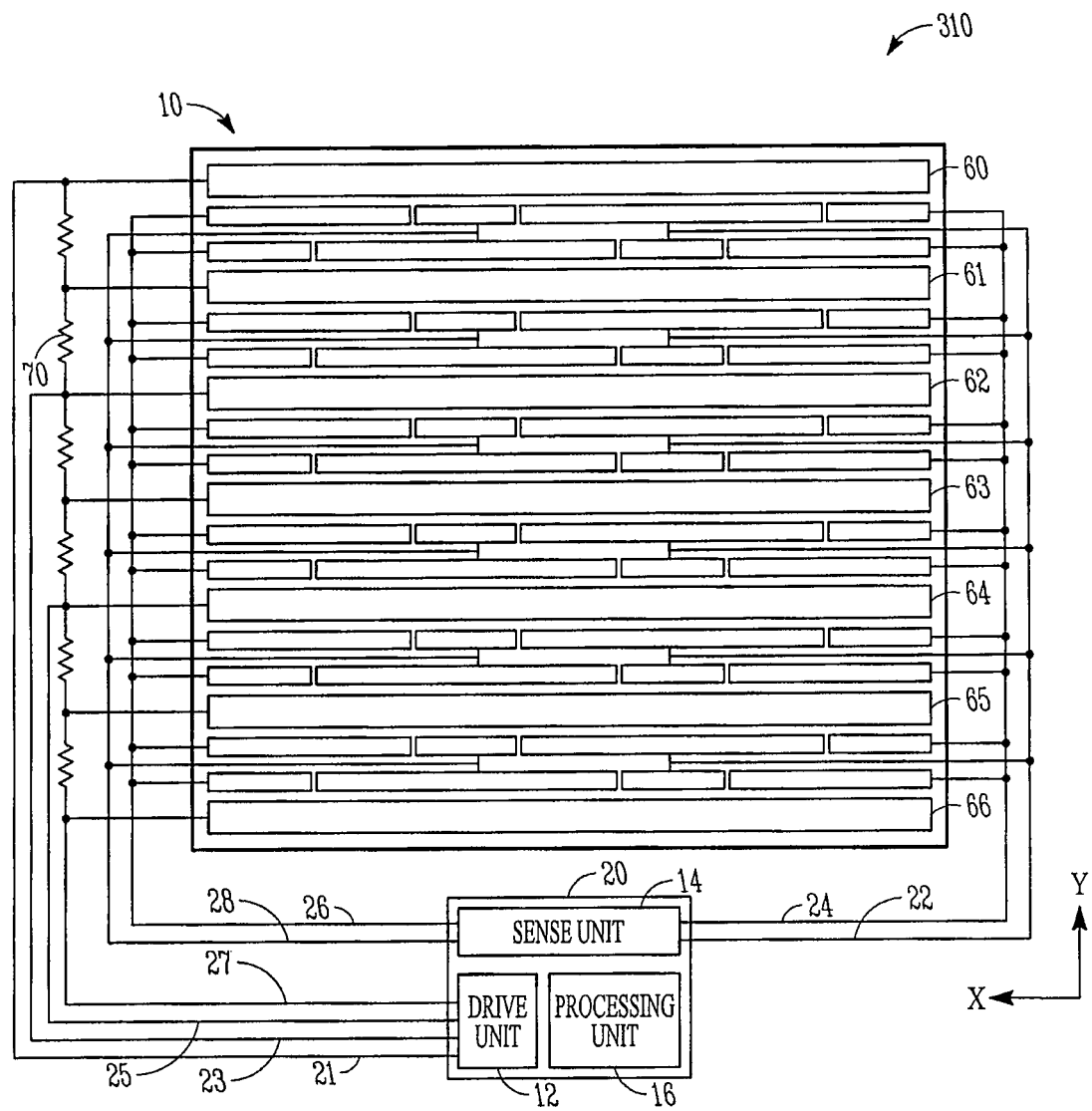
FIG. 3 shows a position sensor according to a third embodiment of the invention comprising a number of electrode units arranged along a first axis, each electrode unit containing an arrangement of drive and sense electrodes.

FIG. 3 is a view of a front side of a position sensor 10 according to a third embodiment of the invention. The drive electrodes of the position sensor 10 are grouped together in groups of three drive electrodes. For example, a first and third (in the y-direction) drive electrode 60, 62 are connected directly to the drive unit 12 via drive connections 21, 23. A second drive electrode 61 that lies between the first and third drive electrodes 60, 62 is connected to each of the first and third drive electrodes 60, 62 via a resistor, one of which is designated by reference character 70. The resistors 70 shown in FIG. 3 will typically have the same value. The value of the resistor should be chosen such that the drive current is kept to minimum, but the time response is also kept to a minimum. Each resistor 70 could be a printed resistive material or a discrete component. When the drive electrodes 60, 61, 62 are driven the third electrode 62 will be connected to ground and the first electrode 60 will be driven using an appropriate drive signal. The second drive electrode 61 will also be driven, but the drive signal will have an amplitude that is half that used to drive the first electrode. Thus, a total of seven drive electrodes are driven by drive lines 21, 23, 25, 27 in the example shown in FIG. 3. It will be appreciated that more drive electrodes can be grouped together and driven using two drive connections or tracks. However, as the number of electrodes that are driven together is increased the amplitude of the signal to each subsequent drive electrode becomes smaller. The final unit may be terminated with drive electrode 66 at the extent of the electrode pattern in the y-direction.

Figure 4A:
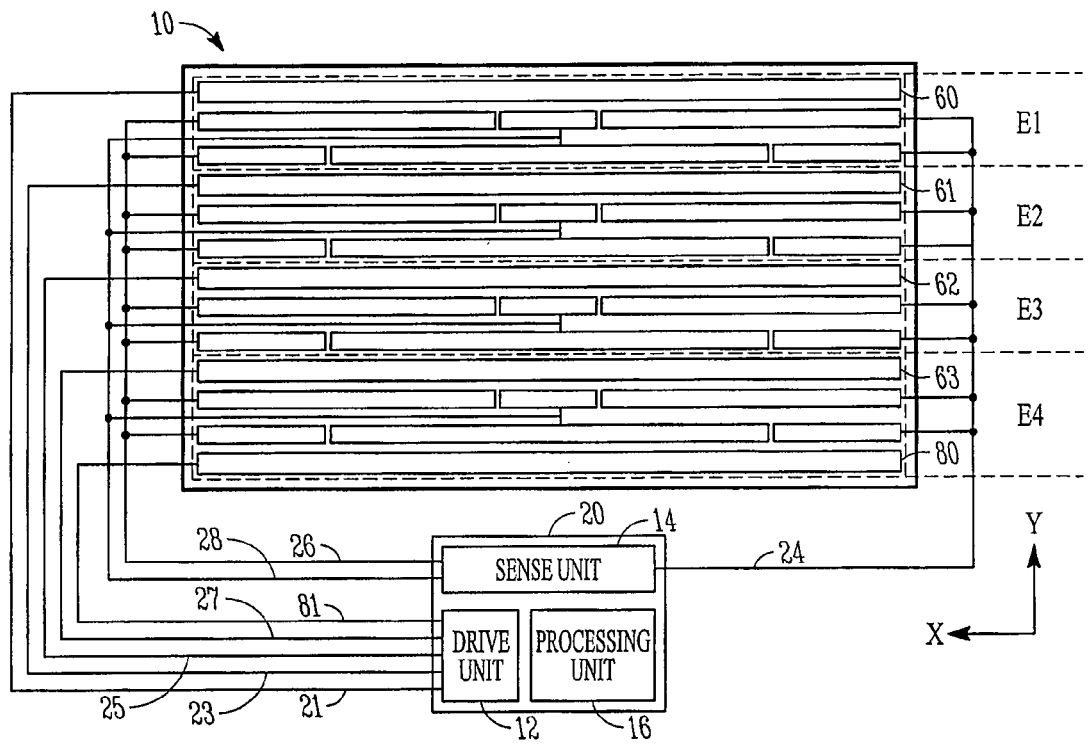
FIG. 4A shows a position sensor according to a fourth embodiment of the invention comprising a number of electrode units arranged along a first axis, each electrode unit containing an arrangement of drive and sense electrodes.

FIG. 4A is a view of a front side of a position sensor 10 according to a fourth embodiment of the invention. The position sensor shown in FIG. 4A is similar to the sensor shown in FIG. 2A in layout and operation. The position sensor shown in FIG. 4A has a reduced number of sense electrodes, i.e. only three groups of sense electrodes. That is to say that the sense lines in each electrode unit are only divided into three sense electrodes that are electrically isolated from one another. The final unit E4 may be terminated with a drive electrode 80 adjacent the lines of sense electrodes at the extent of the electrode pattern in the y-direction. Drive electrode 80 may be driven by drive line 81.

Figure 4B:
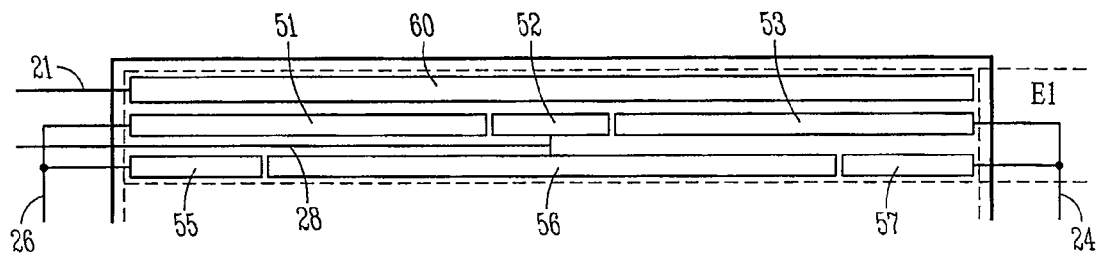
FIG. 4B shows an expanded view of one of the electrode units shown in FIG. 4A.

FIG. 4B shows an expanded view of a portion of the sensor 10 according to the fourth embodiment of the invention which contains one of the electrode units E1. It will be appreciated that only a single electrode unit E1 is shown in FIG. 4B, but the same arrangement may be used for all the other electrode units shown in FIG. 4A. The electrode unit shown in FIG. 4B has a single drive electrode 60 and two lines of sense electrodes. One line of sense electrodes includes electrodes 51, 52 and 53. The other line of sense electrodes includes electrodes 55, 56 and 57. Each of the two lines of sense electrodes is divided into three sense electrodes. It will be appreciated that the sense lines may be divided into a greater or fewer number of sense electrodes than that shown in the figures, for example, 2, 4 or 5 or more.

Figure 5A:
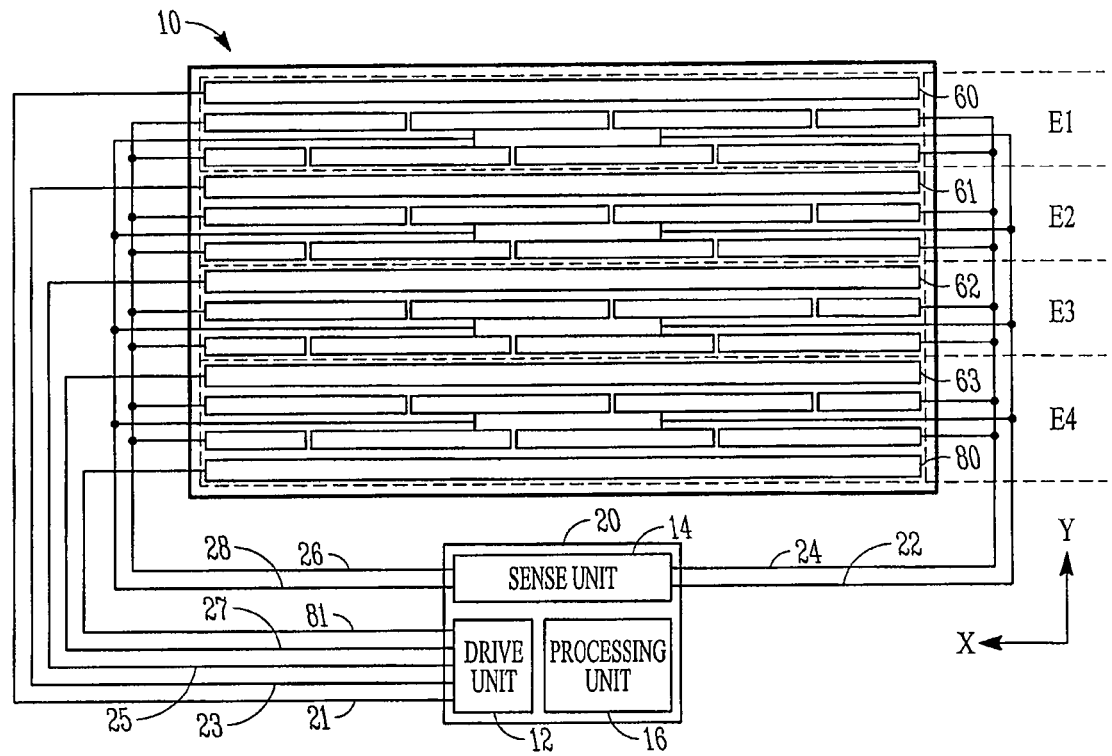
FIG. 5A shows a position sensor according to a fifth embodiment of the invention comprising a number of electrode units arranged along a first axis, each electrode unit containing an arrangement of drive and sense electrodes.

FIG. 5A is a view of a front side of a position sensor 10 according to a fifth embodiment of the invention. The position sensor shown in FIG. 5A is similar to the sensor shown in FIG. 2A in layout and operation. The position sensor shown in FIG. 5A has an alternative arrangement of sense electrodes. In the figure the sense electrodes of the two sense lines are all the same length, excluding the two sense electrodes at the edge of the position sensor within each electrode unit. In alternative embodiments the final unit E4 might be terminated with a drive electrode 80 adjacent the lines of sense electrodes at the extent of the electrode pattern in the y-direction.

Figure 5B:
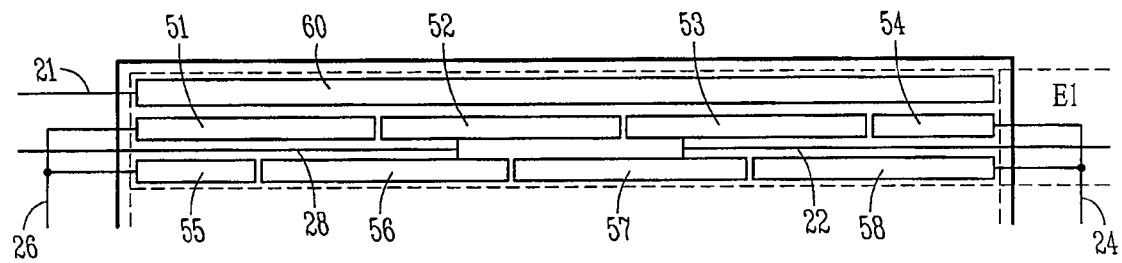
FIG. 5B shows an expanded view of one of the electrode units shown in FIG. 5A.

FIG. 5B shows an expanded view of a portion of the sensor 10 according to the fifth embodiment of the invention which contains one of the electrode units E1. It will be appreciated that only a single electrode unit E1 is shown in FIG. 5B, but the same arrangement may be used for all the other electrode units shown in FIG. 5A. FIG. 5B shows a drive electrode 60 adjacent two lines of sense electrodes. One line of sense electrodes includes electrodes 51, 52, 53 and 54. The other line of sense electrodes includes electrodes 55, 56, 57 and 58. The figure shows that sense electrodes 51, 52, 53 in the one line and sense electrodes 56, 57, 58 in the other line have the same extent in the first direction or first axis.

Figure 6A:
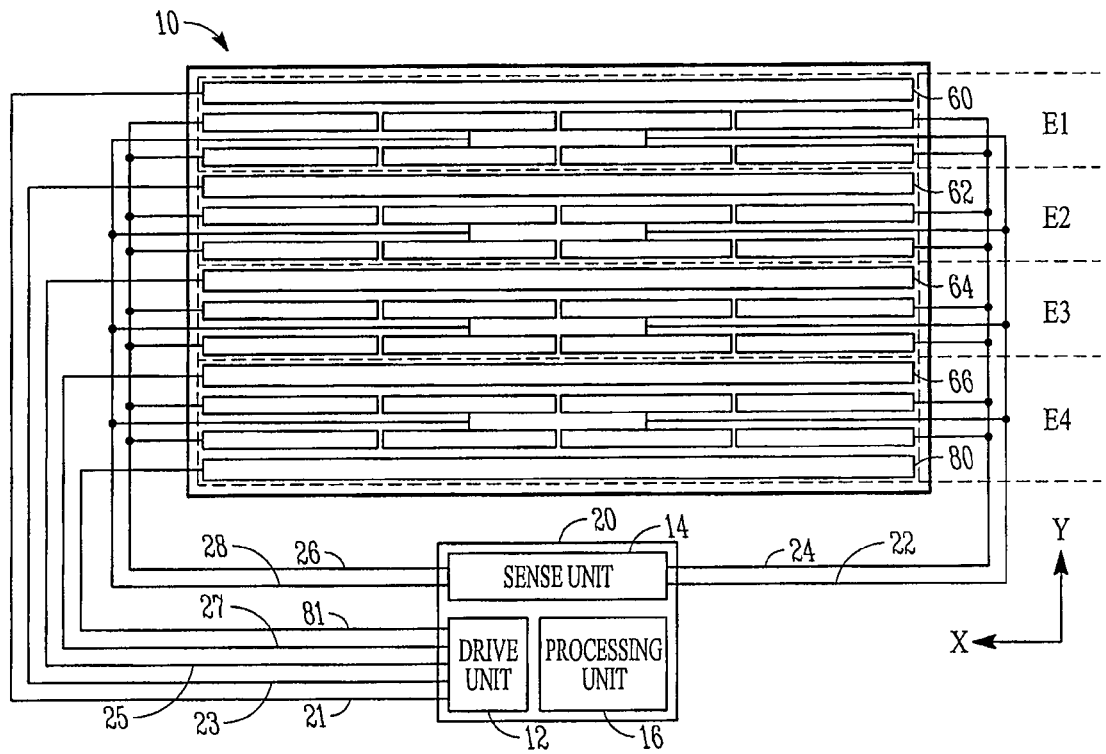
FIG. 6A shows a position sensor according to a sixth embodiment of the invention comprising a number of electrode units arranged along a first axis, each electrode unit containing an arrangement of drive and sense electrodes.

FIG. 6A is a view of a front side of a position sensor 10 according to a sixth embodiment. Like FIG. 2A, FIG. 6 includes four electrode units E1, E2, E3 and E4, in which each electrode unit includes at least one drive electrode and two lines of sense electrodes. However, the extent of each of the sense electrodes is different from that in FIG. 2A, as there is no partial overlap of sense electrodes. In alternative embodiments, the final electrode unit E4 might be terminated with a drive electrode 80 adjacent the lines of sense electrodes at the extent of the electrode pattern in the y-direction. Drive electrode 80 may be driven by drive line 81.

Figure 6B:
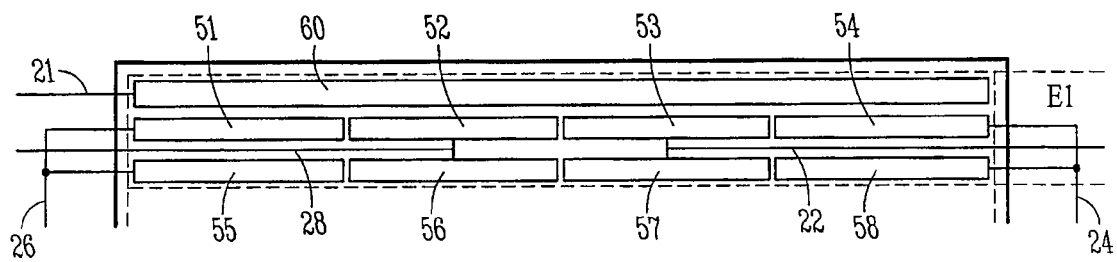
FIG. 6B shows an expanded view of one of the electrode units shown in FIG. 6A.

FIG. 6B shows an expanded view of a portion of the sensor 10 which contains one of the electrode units E1. It will be appreciated that only a single electrode unit E1 is shown in FIG. 6B, but the same arrangement may be used for all the other electrode units shown in FIG. 6A. The electrode unit E1 shown in FIG. 6B contains 8 sense electrodes 51, 52, 53, 54, 55, 56, 57 and 58. As in other embodiments, there are two lines of sense electrodes, four sense electrodes 51, 52, 53, 54 form one line of electrodes, and four sense electrodes 55, 56, 57, 58 form the other line of electrodes. Adjacent electrodes in the y-direction are electrically connected to one another and connected to respective sense lines, as previously described. The sense electrodes shown in the figure all have the same extent and are co-terminus, such that there is no partial overlap between sense electrodes as described for other embodiments. That is to say, adjacent sense electrodes in the y-direction occupy a discrete region of the sensor. It will be appreciated that all the previously described embodiments could also be implemented using sense electrodes with the same extent, such that there is no partial overlap of the sense electrodes.

Figure 7A:
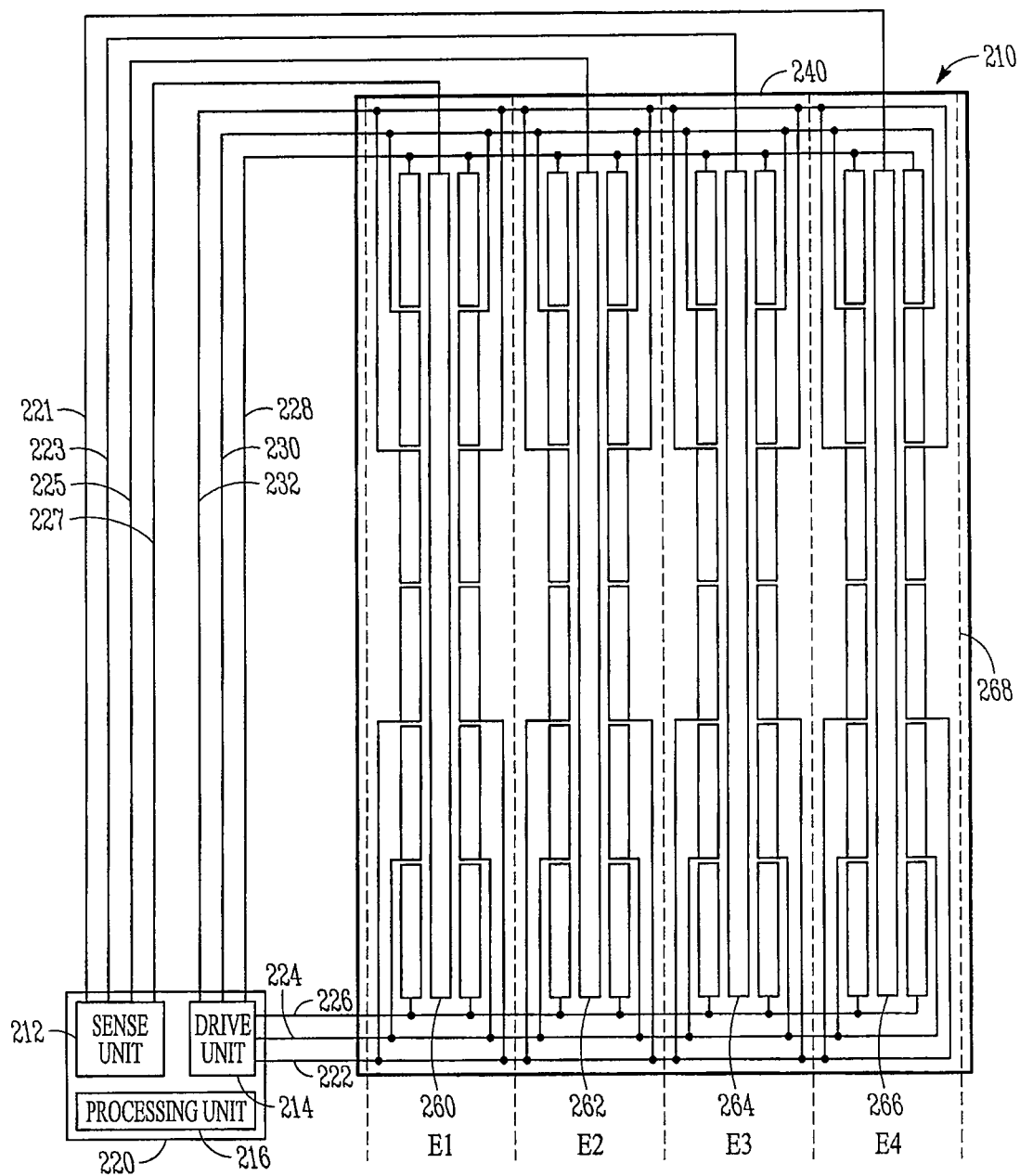
FIG. 7A shows a position sensor according to a seventh embodiment of the invention comprising a number of electrode units arranged along a second axis, each electrode unit containing an arrangement of drive and sense electrodes.

FIG. 7A is a view of a front side of a position sensor 210 according to a seventh embodiment of the invention. The front side of the position sensor is typically the side facing the user during normal use of the sensor or an apparatus incorporating the sensor. The sensor 210 comprises a substrate 240, bearing an electrode pattern defining a sensitive area of the sensor, and a controller 220. The controller 220 is coupled to electrodes of the electrode pattern by a series of electrical connections which will be described below. The electrode pattern is on one side of the substrate, typically on the opposite or underside of the substrate that faces the user. The electrode pattern on the substrate 240 can be provided using conventional techniques as described above.

The controller 220 provides the functionality of a drive unit 214 for supplying drive signals to portions of the electrode pattern, a sense unit 212 for sensing signals from other portions of the electrode pattern, and a processing unit 216 for calculating a position based on the different sense signals seen for drive signals applied to different portions of the electrode pattern. The operation of the controller 220 is described above for other embodiments of the invention.

Referring to FIG. 7A, there are provided a number of electrodes units. In particular, four units are shown E1, E2, E3, E4 which are highlighted by dotted lines 268. Each of the units of electrodes extends in a y-direction also referred to as the second axis. The electrode units are spaced apart in the x-direction or along a first axis.

Each of the units of electrodes shown in the figure comprise one sense electrode, as will be described below, such that there are a total of four sense electrodes 260, 262, 264, 266. Associated with the sense electrode in each electrode unit are two lines of drive electrodes. The first line of drive electrodes is adjacent one longitudinal edge of the sense electrode 260 and the other line is adjacent the other longitudinal edge or side of the sense electrode 260. There are thus three lines of electrodes—one sense and two drive—extending parallel to each other. These three lines of electrodes collectively form a functional unit which is referred to as the electrode unit. The electrode unit has a lower sense electrode area than some prior designs which may result in reduced sensitivity to noise from underlying display components.

The electrode units are connected to the drive unit 214 and the sense unit 212 via a number of electrical connections. Referring to the sense electrodes, the electrodes 260, 262, 264 266 are connected to the sense unit via a number of sense connections 221, 223, 225, 227. Six drive connections 222, 224, 226, 228, 230, 232 are used to connect the drive electrodes of each electrode unit E1, E2, E3, E4 to the drive unit 214, as will be described below.

Figure 7B:
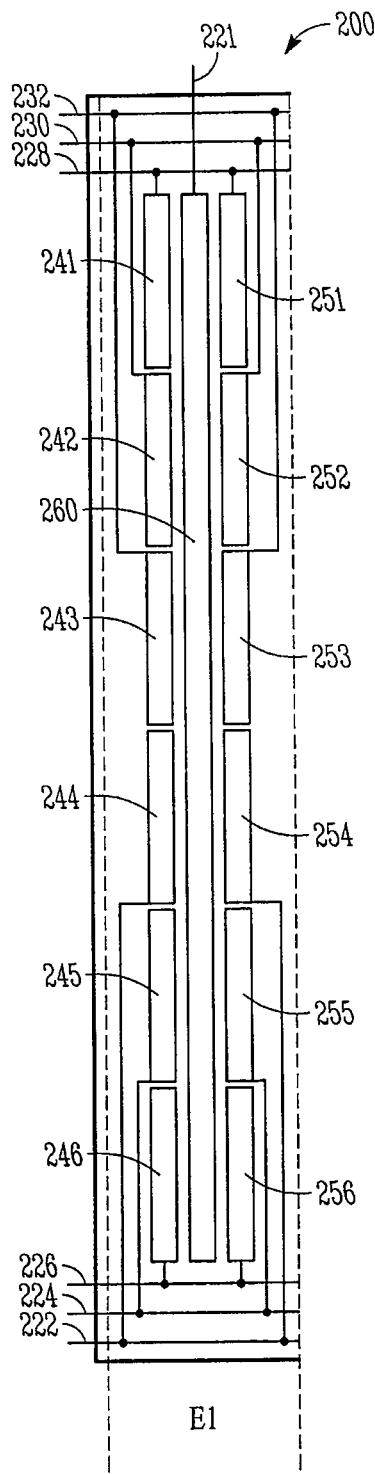
FIG. 7B shows an expanded view of one of the electrode units shown in FIG. 7A.

FIG. 7B shows an expanded view of a portion 200 of the sensor 210 which contains one of the electrode units E1. Within the electrode unit E1 shown in the figure there is one sense electrode 260 extending parallel to the second axis down the area. The sense electrode 260 is electrically coupled to the sense unit (not shown) via a sense connection 221. There are two lines of drive electrodes associated with the sense electrode 260. The first line of drive electrodes is adjacent one longitudinal edge of the sense electrode 260. The first line of drive electrodes includes six drive electrodes 251, 252, 253, 254, 255, 256 isolated from one another. The second line of drive electrodes is adjacent the other longitudinal edge or side of the sense electrode and includes six drive electrodes 241, 242, 243, 244, 245, 246 isolated from one another. The extent of the isolated drive electrodes is the same. However, it will be appreciated that the extents of the drive electrodes may be varied.

The drive electrodes in the two lines of drive electrodes are interconnected. As shown in the figure the first two neighboring drive electrodes 251, 241 of the two drive lines are electrically coupled together and connected to the drive unit (not shown) via drive connection 228. The second two neighboring drive electrodes 252, 242 of the two drive lines are electrically coupled together and connected to the drive unit (not shown) via drive connection 230. The third two neighboring drive electrodes 253, 243 of the two drive lines are electrically coupled together and connected to the drive unit (not shown) via drive connection 232. The fourth two neighboring drive electrodes 254, 244 of the two drive lines are electrically coupled together and connected to the drive unit (not shown) via drive connection 222. The fifth two neighboring drives electrodes 255, 245 of the two drive lines are electrically coupled together and connected to the drive unit (not shown) via drive connection 224. The sixth two neighboring drive electrodes 256, 246 of the two drive lines are electrically coupled together and connected to the drive unit (not shown) via drive connection 226. Thus, the neighboring drive electrodes from the two drive lines form six drive electrodes groups.

The drive electrodes from each of the four electrodes units E1, E2, E3 E4 are connected together to form first, second, third, fourth, fifth and sixth drive electrodes. These drive electrodes effectively extend parallel to the first axis of the sensor.

Referring to the drive connections, the drive electrodes having an edge at the periphery of the electrode pattern 241, 251, 246, 256 are connected to the drive unit via two connections 228, 226 that extend from the periphery edge of the electrodes. However, the drive electrodes in the centre of the electrode pattern 242, 252, 242, 253, 244, 254, 245, 255 are connected via tracks or connections 222, 224, 230, 232 that are routed between the first and second lines of drive electrodes as shown in FIG. 7B.

Figure 7C:
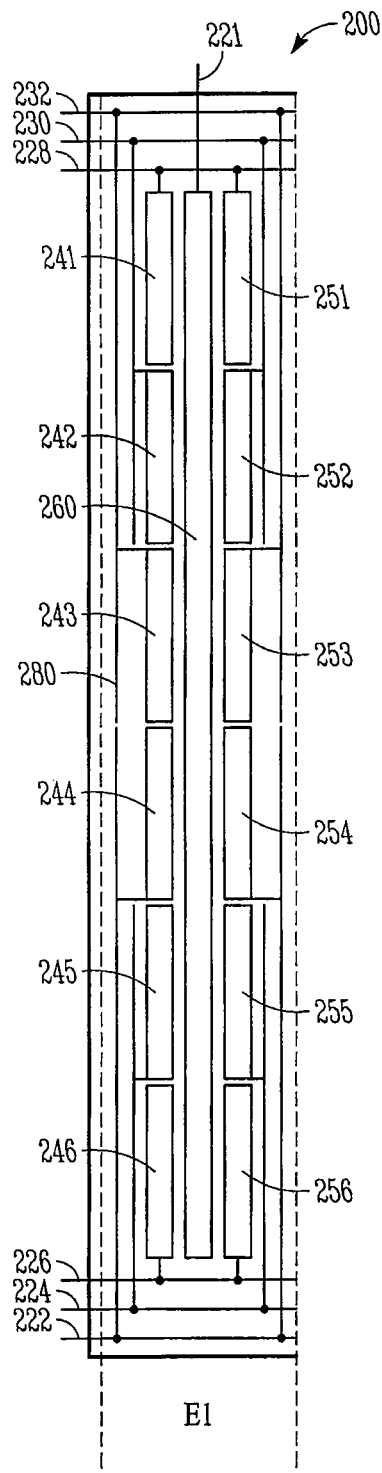
FIG. 7C shows an exploded view of one of the electrode units shown in FIG. 7A with an alternative arrangement of drive and sense electrodes.

FIG. 7C shows an electrode unit E1 with an alternative sense electrode arrangement to that shown in FIG. 7B. It will be appreciated that only a single electrode unit E1 is shown in FIG. 7C, but the same arrangement may be used for all the other electrode units shown in FIG. 7A. In the electrode unit E1 the drive connection tracks of the electrode pattern further include an extension portion 280. The extension portion 280 extends beyond the point at which the connection track couples to the electrode and is parallel to the electrode, as shown in the figure.

Figure 7D:
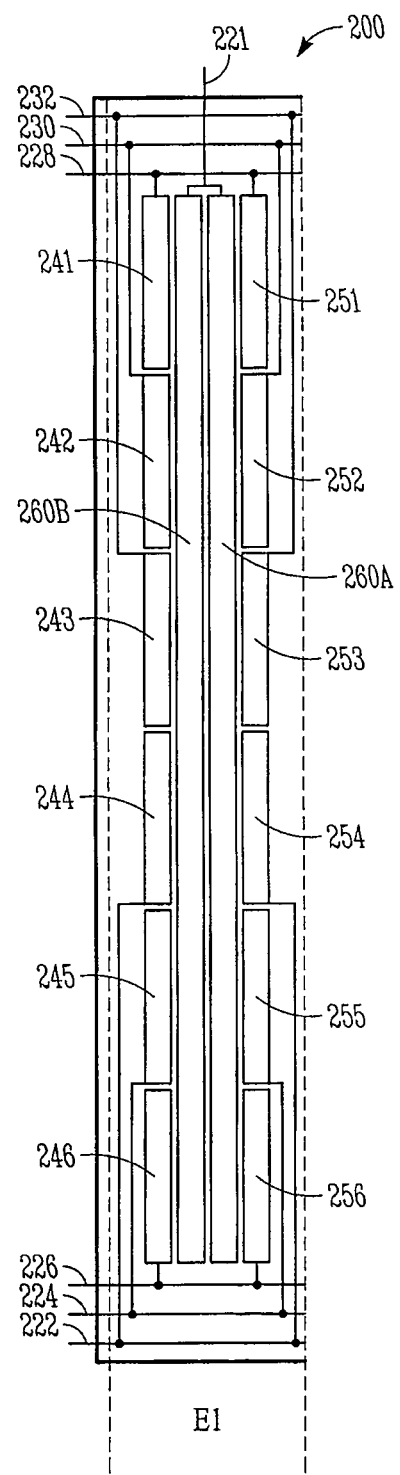
FIG. 7D shows an exploded view of one of the electrode units shown in FIG. 7A with an alternative arrangement of drive and sense electrodes.

FIG. 7D shows an electrode unit E1 with an alternative sense electrode arrangement to that shown in FIG. 7B. It will be appreciated that only a single electrode unit E1 is shown in FIG. 7D, but the same arrangement may be used for all the other electrode units shown in FIG. 7A. In the electrode unit E1 shown in FIG. 7D two sense electrodes 260A, 260B are provided, such that one line of drive electrodes 241, 242, 243, 244, 245, 246 are adjacent one sense electrode 260A and the other line of drive electrodes 251, 252, 253, 254, 255, 256 are adjacent the other sense electrode 260B in the electrode unit. The two sense electrodes 260A, 260B are connected to the sense unit (not shown) via sense connections 221A, 221B. The two sense electrodes 260A, 260B may be sensed together or individually.

Figure 7E:
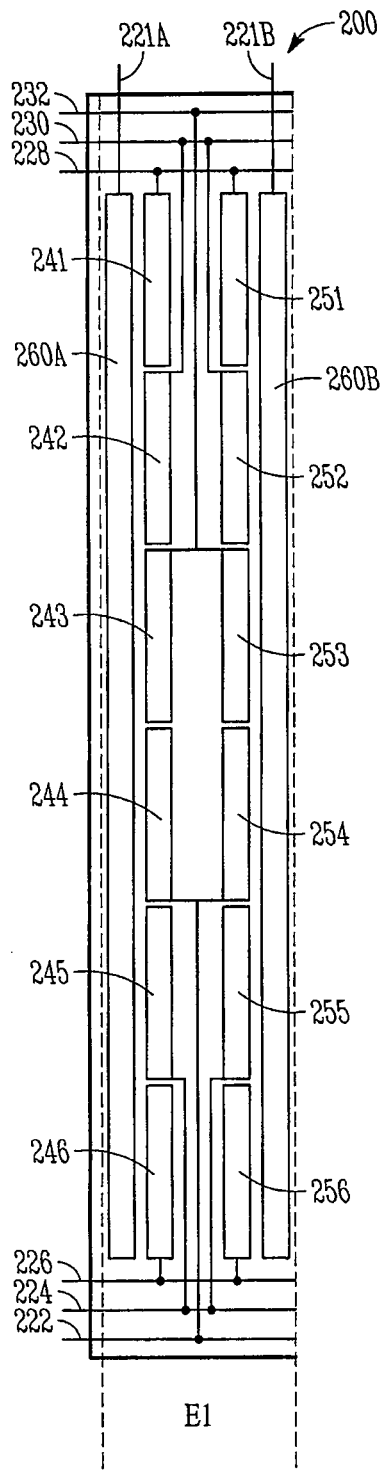
FIG. 7E shows an exploded view of one of the electrode units shown in FIG. 7A with an alternative arrangement of drive and sense electrodes.

FIG. 7E shows an electrode unit E1 with an alternative sense electrode arrangement to that shown in FIG. 7B. It will be appreciated that only a single electrode unit E1 is shown in FIG. 7E, but the same arrangement may be used for all the other electrode units shown in FIG. 7A. In the electrode unit E1 shown in FIG. 7F two sense electrodes 260A, 260B are provided, such that the two lines of drive electrodes 241, 242, 243, 244, 245, 246, 251, 252, 253, 254, 255, 256 are arranged between two sense electrodes 260A, 260B in the electrode unit. The two sense electrodes 260A, 260B are connected to the sense unit (not shown) via sense connections 221A, 221B. The two sense electrodes 260A, 260B may be sensed together or individually.

Figure 7F:
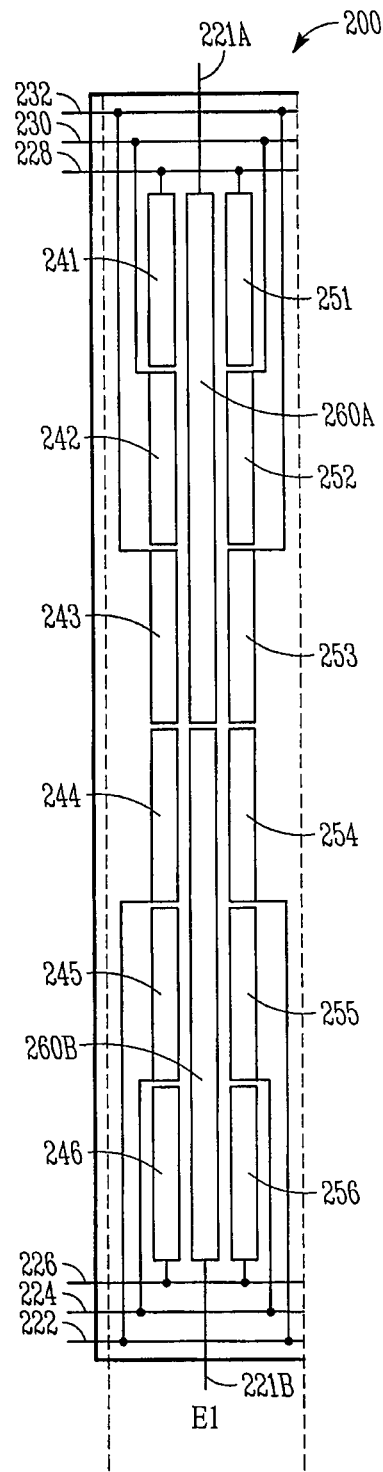
FIG. 7F shows an exploded view of one of the electrode units shown in FIG. 7A with an alternative arrangement of drive and sense electrodes.

FIG. 7F shows an electrode unit E1 with an alternative sense electrode arrangement to that shown in FIG. 7B. It will be appreciated that only a single electrode unit E1 is shown in FIG. 7F, but the same arrangement may be used for all the other electrode units shown in FIG. 7A. In the electrode unit E1 shown in FIG. 7F the sense line is provided by two sense electrodes 260A, 260B. The sense electrodes 260A, 260B are connected to the sense unit (not shown) via sense connections 221A, 221B. The two sense electrodes 260A, 260B may be sensed together. This arrangement of sense electrodes may be used to allow the connections to the central drive electrodes to be routed between the two sense electrodes.

It will be appreciated that the patterns shown in FIGS. 1A, 1B, 1C, 2A, 2B, 2C, 2D, 3, 4A, 4B, 5A, 5B, 6A, 6B, 7A, 7B, 7C, 7D, repeated or extended in both the x- and y-direction.

Any of the modifications or alternative electrode arrangements described above can be applied to any of the embodiments described herein. In particular, each electrode unit may comprise one drive electrode or multiple drive electrodes e.g. two drive electrodes and each electrode unit may comprise two or more sense lines. Furthermore, the sense lines may be divided into two or more sense electrodes, e.g. three or four and the drive lines may be divided into two or more drive electrodes. The extent and relative position of the sense electrodes of the sense lines may also be varied.

The arrangement of sensor electrodes as described above may be used to reduce the amount of noise that is detected. This is achieved by reducing the area of the electrodes, while retaining the same effective sense area.

It will be appreciated that the sensor may be applicable to many types of devices/appliances. For example, sensors can be used with ovens, grills, washing machines, tumble-dryers, dish-washers, microwave ovens, food blenders, bread makers, drinks machines, computers, home audiovisual equipment, personal computers, portable media players, PDAs, cell phones, computers, games consoles and so forth.

Using spaced apart lines of sense electrodes with groups of partially overlapping extent differs from the prior approaches of using co-extensive tapered pairings of sense electrodes. Specifically, the claimed design allows the electrodes to be made of substantially less material, thereby reducing noise pick up. The design approach of the invention also allows geometric patterns to be provided which are simple for fabrication, avoiding oblique electrode boundary lines, and hence less prone to fabrication errors. The patterns may also be regular in the chosen co-ordinate system, e.g. Cartesian where the first and second axes are orthogonal x and y axes, or polar in which the first and second axes are radial and angular. Regularity of the pattern generally provides an aesthetically less disturbing solution to the extent that the electrode patterns can be seen by an end user, e.g. when the position sensor is on a transparent substrate overlying a display.

The sense electrodes of each sense electrode group may be arranged such that a sense electrode in one line is arranged relative to an interconnected sense electrode in another line such that one end is part way along the interconnected sense electrode and the other end is either part way along the interconnected sense electrode or co-terminus. Alternatively, the sense electrodes of each sense electrode group may be arranged such that a sense electrode in one line is arranged relative to an interconnected sense electrode in another line such that one end is part way along the interconnected sense electrode and the other end is either situated beyond the end of the interconnected sense electrode or co-terminus. (This provides a staggered pattern.)

The width and spacing of the lines of electrodes may be relatively small. For example, the drive and sense electrodes may have a width of less than at least one of 3 mm, 2.5 mm, 2 mm, 1.5 mm 1 mm and 0.5 mm, 0.4 mm, 0.3 mm, 0.2 mm and 0.1 mm. For example, the adjacent lines of drive and sense electrodes have a spacing in the second axis of less than at least one of 2 mm, 1.5 mm, 1 mm, 0.5 mm, 0.4 mm 0.3 mm 0.2 mm and 0.1 mm. The width of the tracks or connections between electrodes may be smaller in width. In some embodiments, the width and number of sense tracks or connections running between the sense electrodes may define a minimum spacing for the sense electrodes.

In some embodiments, the electrode pattern may be arranged on one side of a substrate. The electrically connected sense electrodes may form co-extensive complementary electrodes over their distance of co-extension to provide ratiometric capacitive signals. The electrically connected sense electrodes may have adjacent blocks of varying area over their distance of co-extension to provide ratiometric capacitive signals.

In some embodiments, a capacitive position sensor has a touch-sensitive area defined by a single-layer of electrodes arranged in a pattern along first and second axes, the pattern comprising a plurality of units each occupying a portion of the touch sensitive area along the second axis, and each unit comprising at least three lines of elongate electrodes extending parallel to the first axis and spaced apart in the second axis, there being at least one line of drive electrodes and two lines of sense electrodes per unit, wherein the sense electrodes of each unit are arranged in interconnected groups, each group having at least two sense electrodes from more than one line which have the same extents along the first axis and are co-terminus. The sense electrodes may have the same extents along the first axis or each group of sense electrodes may have varying extents along the first axis.

A method of sensing position of an actuation on a capacitive position sensor includes applying drive signals to the drive electrodes, measuring sense signals received from each group of the sense electrodes representing a degree of capacitive coupling of the drive signals between the drive electrodes and each group of the sense electrodes, determining position in the first axis by an interpolation between sense signals obtained from the sense electrodes of each group of sense electrodes, and determining position in the second axis by an interpolation between sense signals obtained by sequentially driving the drive electrodes with respective drive signals.

In still further embodiments, a capacitive position sensor has a touch-sensitive area defined by a single-layer of electrodes arranged in a pattern along first and second axes. The pattern includes a plurality of units each occupying a portion of the touch sensitive area along the first axis. Each unit includes at least three lines of elongate electrodes extending parallel to the second axis and spaced apart in the first axis, there being at least one line of sense electrodes and two lines of drive electrodes per unit, wherein the drive electrodes of each unit are arranged in interconnected groups. Each group has at least two drive electrodes from more than one line which have the same extents along the second axis and are co-terminus.

The drive electrodes may have the same extents along the second axis or each group of drive electrodes may have varying extents along the second axis. In some embodiments, each unit has two lines of sense electrodes and a plurality of lines of drive electrodes arranged in between the sense electrodes as viewed along the first axis. In some embodiments, each unit has one line of sense electrodes and a plurality of lines of drive electrodes arranged adjacent the sense electrodes as viewed along the first axis. In some embodiments, each unit has lines of drive electrodes arranged either side of the sense electrodes. There may be two, three or more (e.g. 4 or 5) lines of drive electrodes per unit. In some embodiments, the electrode pattern is terminated the same type of electrode with which the electrode pattern starts.

FIG. 8 shows an example of a mobile personal computer (PC) 120. A touch sensor according to the present technique could be used to form part or the whole of an input control panel of the notebook PC 120. In the figure, the PC 120 is shown, which includes a display device 122 attached to a base 124, which accommodates a processor and other components typically associated with a PC. An input control panel 126 includes a keyboard 128. The input control panel 126 further includes a touch sensitive mouse pad 130. The mouse pad can be implemented using a touch sensor according to the present invention. Moreover, the display device 122 can also be implemented with a touch sensor according to the present invention overlaid on top of it to provide a touch screen. This may be particularly useful for a tablet PC.

FIG. 9 schematically shows a washing machine 91 incorporating a control panel 93 which incorporates a sensor according to the invention.

FIG. 10 schematically shows a cellular telephone 95 which may incorporate one or more sensors according to an embodiment of the invention. A two-dimensional sensor 98 according to the invention may be used to provide the button panel with buttons 99, or may be a separate sensor co-extensive with the button panel. For example, the button panel may be retained as a mechanical assembly and the sensor provided to allow drawing, writing or command gestures to be performed by the user over the button panel area, for example to compose text messages in Chinese or other Asian characters. The screen 97 may also be overlaid with a sensor according to the invention.

The sensors may be used in conjunction with any appliance having a human-machine interface. In some embodiments, a sensor may be provided separately from a device/appliance which it may be used to control, for example to provide an upgrade to a pre-existing appliance. In further embodiments, a generic sensor may be configured to operate a range of different appliances. For example, a sensor may be provided that has programmable keys which a device/appliance provider may associate with desired functions by appropriate configuration, for example by reprogramming.

The invention claimed is:
1. A device comprising:
a first region extending along a first axis comprising a first bar shaped electrode extending along the first axis and within the first region, the first bar shaped electrode formed in a first layer of a capacitive sensor;
a second region extending along the first axis comprising at least three bar shaped electrodes formed in the first layer of the capacitive sensor and formed within the second region, each of the at least three bar shaped electrodes extending along the first axis, each of the at least three bar shaped electrodes being distinct from one another such that no electrodes are present in the first layer between the first region and the second region, the second region parallel and adjacent to the first region, the second region distinct from the first region;
a third region extending along the first axis comprising a second bar shaped electrode formed in the first layer of the capacitive sensor, the second bar shaped electrode extending along the first axis and arranged within the third region, the third region parallel and adjacent to the second region such that no electrodes are present in the first layer between the second region and the third region, the third region distinct from the first region and the second region; and
a plurality of tracks configured to selectively couple electrodes within the second region and the third region.
2. The device of claim 1 wherein the second bar shaped electrode is situated within the third region such that the second bar shaped electrode at least partially overlaps in the first axis with at least one of the at least three bar shaped electrodes within the second region.
3. The device of claim 2 wherein: the electrodes within the second region and the third region are sense electrodes; the first bar shaped electrode is a drive electrode and is configured to extend along the length of the at least three bar shaped electrodes; and the device further comprises a fourth region extending along the first axis comprising a third bar shaped drive electrode formed in the first layer of the capacitive sensor extending along the first axis at a length substantially similar to the first bar shaped electrode, the fourth region parallel and adjacent to the third region, the fourth region distinct from the first, second, and third regions, the third bar shaped electrode being a drive electrode.
4. The device of claim 2 wherein each of the at least three bar shaped electrodes have substantially the same length as each other.
5. The device of claim 2 wherein the plurality of tracks:
are narrower than the electrodes within the first, second, and third regions; and extend between electrodes within the second region and the third region to couple an electrode from the second region to an electrode from the third region that at least partially overlap in the first axis.

6. The device of claim 1 wherein: the electrodes within the second region and the third region are drive electrodes; the third region further comprises a third bar shaped electrode extending along the first axis and formed in the first layer of the capacitive sensor, the third bar shaped electrode distinct from the second bar shaped electrode; the second bar shaped electrode at least partially overlaps in the first axis with a fourth electrode within the second region; the third bar shaped electrode at least partially overlaps in the first axis with a fifth electrode within the second region, the fifth electrode within the second region different than the fourth electrode within the second region; and the plurality of tracks comprises: a first track configured to couple the second bar shaped electrode to the fourth electrode within the second region; and a second track configured to couple the third bar shaped electrode to the fifth electrode within the second region.

7. The device of claim 6 wherein: the first bar shaped electrode is a first bar shaped sense electrode configured to extend along the length of the electrodes within the second region; and the device further comprises a fourth region extending along the first axis comprising a sixth bar shaped electrode formed in the first layer of the capacitive sensor extending along the first axis at a length substantially similar to the first bar shaped sense electrode, the fourth region parallel and adjacent to the third region, the fourth region distinct from the first, second, and third regions, the sixth bar shaped electrode being a sense electrode.

8. The device of claim 7 wherein each of the at least three bar shaped electrodes have substantially the same length as each other.

9. A capacitive position sensor comprising:
a touch-sensitive area defined by a single-layer of electrodes arranged in a pattern along first and second axes in a first layer,
the pattern comprising a plurality of units each occupying a portion of the touch sensitive area along the second axis,
each of the plurality of units comprising at least three regions extending parallel to the first axis and spaced apart in the second axis such that no electrodes are present in the first layer between any two adjacent regions of the at least three regions and such that no two regions of the at least three regions comprise a common electrode in the first layer, each of the at least three regions distinct from one another,
at least one region of the at least three regions comprising a line of drive electrodes situated within a single region of the at least three regions,
each of at least two regions of the at least three regions comprising a line of sense electrodes situated within a single region of the at least three regions,
wherein the sense electrodes of each unit are arranged in groups of interconnected sense electrodes,
each of the groups comprising sense electrodes from more than one of the lines of sense electrodes coupled to one another, and
each of the groups comprising sense electrodes that have partially overlapping extents along the first axis.

10. The sensor of claim 9, wherein each unit has two lines of drive electrodes and a plurality of lines of sense electrodes arranged in between the drive electrodes along the second axis.

11. The sensor of claim 9, wherein the at least three regions of each unit are arranged such that:
a first region of the at least three regions comprises the line of drive electrodes;
a second region of the at least three regions comprises a first line of sense electrodes, the second region adjacent to the first region along the second axis; and
a third region of the at least three regions comprises a second line of sense electrodes, the third region adjacent to the second region along the second axis.

12. The sensor of claim 9, wherein the at least three regions of each unit are arranged such that:
a first region of the at least three regions comprises a first line of sense electrodes;
a second region of the at least three regions comprises the line of drive electrodes, the second region adjacent to the first region along the second axis; and
a third region of the at least three regions comprises a second line of sense electrodes, the third region adjacent to the second region along the second axis.

13. The sensor of claim 9, wherein the at least three regions of each unit comprises only two lines of sense electrodes and at least one line of drive electrodes.

14. The sensor of claim 9, wherein each line of sense electrodes of each unit comprises at least three electrodes.

15. The sensor of claim 9, wherein each of the groups of interconnected sense electrodes comprises a first sense electrode in one line that at least partially overlaps in the first axis, and is interconnected with, a second sense electrode in another line.

16. A method comprising: applying drive signals to a plurality of longitudinal drive electrodes in a first layer of a capacitive sensor, the plurality of longitudinal drive electrodes arranged within a first set of regions such that each of the plurality of longitudinal drive electrodes is arranged within only one of the regions in the first set of regions, each region of the first set of regions extending along a first axis of the first layer of the capacitive sensor;
measuring sense signals received from a plurality of longitudinal segmented sense electrodes in the first layer of the capacitive sensor, the plurality of longitudinal segmented sense electrodes arranged within a second set of regions such that each of the plurality of longitudinal segmented sense electrodes is arranged within only one of the regions in the second set of regions, each region of the second set of regions extending along the first axis of the first layer of the capacitive sensor, each region of the second set of regions adjacent to a region of the first set of regions such that no electrodes are present in the first layer between a region of the first set of regions and a region of the second set of regions, each region of the second set of regions distinct from the first set of regions, each region of the second set of regions distinct from one another, the sense signals representing a degree of capacitive coupling of the drive signals between the plurality of longitudinal drive electrodes and the plurality of longitudinal segmented sense electrodes;
determining position in the first axis by an interpolation between sense signals obtained from the plurality of longitudinal segmented sense electrodes; and
determining position in a second axis by an interpolation between sense signals obtained by sequentially driving the plurality of longitudinal drive electrodes with respective drive signals, the second axis different than the first axis.

17. A capacitive position sensor comprising: a touch-sensitive area defined by a single-layer of electrodes arranged in a pattern along first and second axes in a first layer, the pattern comprising a plurality of units each occupying a portion of the touch sensitive area along the first axis, and each unit comprising at least three regions extending along the second axis and spaced apart in the first axis such that no electrodes are present in the first layer between any two adjacent regions of the at least three regions and such that no two regions of the at least three regions comprise a common electrode in the first layer, each of the at least three regions distinct from one another, at least one region of the at least three regions comprising a line of sense electrodes situated within the at least one region, each of at least two regions of the at least three regions comprising a line of drive electrodes situated within a single region of the at least three regions, wherein the drive electrodes of each unit are arranged in groups of interconnected drive electrodes, each of the groups of interconnected drive electrodes comprising at least two drive electrodes coupled to one another, the at least two drive electrodes from more than one of the lines of drive electrodes, and each of the groups of interconnected drive electrodes comprising drive electrodes that have at least partially overlapping extents along the second axis.

18. The sensor of claim 17, wherein the drive electrodes have substantially the same extents along the second axis.

19. The sensor of claim 17, wherein at least two of the drive electrodes of one of the plurality of units have varying extents along the second axis.

20. The sensor of claim 17, wherein the at least three regions of each unit are arranged such that:
  a first region of the at least three regions comprises a line of sense electrodes;
  a second region of the at least three regions comprises a first line of drive electrodes, the second region adjacent to the first region along the first axis;
  a third region of the at least three regions comprises a second line of drive electrodes, the third region adjacent to the second region along the first axis; and
  a fourth region of the at least three regions comprises a third line of sense electrodes, the fourth region adjacent to the third region along the first axis.

21. The sensor of claim 17, wherein the at least three regions of each unit are arranged such that:
  a first region of the at least three regions comprises a first line of drive electrodes;
  a second region of the at least three regions comprises a line of sense electrodes, the second region adjacent to the first region along the first axis; and
  a third region of the at least three regions comprises a second line of drive electrodes, the third region adjacent to the second region along the first axis.

22. The sensor of claim 17, wherein the drive electrodes and the sense electrodes are substantially rectangular in shape.

23. A method of sensing position of an actuation on a capacitive position sensor having a touch-sensitive area defined by a single-layer of electrodes arranged in a pattern along first and second axes, the pattern comprising a plurality of units each occupying a portion of the touch sensitive area along the first axis, and each unit comprising at least three regions extending parallel to the second axis and spaced apart in the first axis such that no electrodes are present in the first layer between any two adjacent regions of the at least three regions and such that no two regions of the at least three regions comprise a common electrode in the first layer, each of the at least three regions distinct from one another, at least one region of the at least three regions comprising one line of sense electrodes and each of at least two regions of the at least three regions comprising a line of drive electrodes, wherein the drive electrodes of each unit are arranged in groups of interconnected drive electrodes, each of the groups of interconnected drive electrodes having at least two drive electrodes coupled to one another from more than one of the lines of drive electrodes, and the at least two drive electrodes having substantially the same extents along the second axis and being substantially co-terminus, the method comprising: applying drive signals to the drive electrodes; measuring sense signals received from each sense electrode representing a degree of capacitive coupling of the drive signals between the drive electrodes and each of the sense electrodes; determining position in the first axis by an interpolation between sense signals obtained from the sense electrodes of each sense electrode; and determining position in the second axis by an interpolation between sense signals obtained by sequentially driving the groups of interconnected drive electrodes with respective drive signals.

24. The device of claim 1, wherein the first bar shaped electrode, the second bar shaped electrode, and the at least three bar shaped electrodes are substantially rectangular in shape.

25. The sensor of claim 9, wherein the drive electrodes and sense electrodes are substantially rectangular in shape.

26. The device of claim 1, wherein the second axis is the x-axis.

27. The sensor of claim 9, wherein the second axis is the x-axis.

28. The method of claim 16, wherein the second axis is the x-axis.

29. The sensor of claim 17, wherein the second axis is the x-axis.

30. The method of claim 23, wherein the second axis is the x-axis.

* * * * *